(12) United States Patent
Shih et al.

(10) Patent No.: US 11,706,616 B2
(45) Date of Patent: *Jul. 18, 2023

(54) MOBILITY MANAGEMENT FOR RRC_INACTIVE USER EQUIPMENT

(71) Applicant: FG Innovation Company Limited, Tuen Mun (HK)

(72) Inventors: Mei-Ju Shih, Taipei (TW); Yung-Lan Tseng, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 164 days.

This patent is subject to a terminal disclaimer.

(21) Appl. No.: 17/085,495

(22) Filed: Oct. 30, 2020

(65) Prior Publication Data

US 2021/0051472 A1 Feb. 18, 2021

Related U.S. Application Data

(63) Continuation of application No. 15/894,074, filed on Feb. 12, 2018, now Pat. No. 10,897,708.

(60) Provisional application No. 62/457,944, filed on Feb. 12, 2017.

(51) Int. Cl.
*H04W 12/04* (2021.01)
*H04W 60/00* (2009.01)
*H04W 36/00* (2009.01)
*H04W 36/08* (2009.01)
*H04W 74/08* (2009.01)

(52) U.S. Cl.
CPC ....... *H04W 12/04* (2013.01); *H04W 36/0005* (2013.01); *H04W 60/00* (2013.01); *H04W 36/08* (2013.01); *H04W 74/0833* (2013.01)

(58) Field of Classification Search
CPC ............. H04W 36/0005; H04W 60/00; H04W 74/0833; H04W 12/04; H04W 36/08
See application file for complete search history.

(56) References Cited

U.S. PATENT DOCUMENTS 10,897,708 B2 1/2021 Shih et al.
2017/0311290 A1* 10/2017 Adjakple ............... H04W 76/18
2018/0092157 A1* 3/2018 Chen ..................... H04W 76/27
(Continued)

FOREIGN PATENT DOCUMENTS

CN 110832917 B 11/2021
EP 3583809 B1 3/2022

*Primary Examiner* — Rushil Parimal Sampat
(74) *Attorney, Agent, or Firm* — ScienBiziP, P.C.

(57) ABSTRACT

A method for radio access network (RAN) based notification area (RNA) update for a radio resource control (RRC)_INACTIVE user equipment (UE) in an RRC_INACTIVE state is disclosed. The method includes receiving, by the RRC_INACTIVE UE in the RRC_INACTIVE state, a first list of RAN area identities (IDs) from a first cell; receiving, by the RRC_INACTIVE UE in the RRC_INACTIVE state, identification information broadcast by a second cell, the identification information including a RAN area ID of the second cell and a cell ID of the second cell; and transmitting, by the RRC_INACTIVE UE in the RRC_INACTIVE state, at least one of an inactive-radio network temporary identifier (I-RNTI) and a cell ID of the first cell to the second cell, after determining that the RAN area ID of the second cell does not belong to the first list of RAN area IDs.

14 Claims, 16 Drawing Sheets

(56) References Cited

U.S. PATENT DOCUMENTS

2018/0234941 A1* 8/2018 Kim .................... H04W 68/005
2018/0376401 A1* 12/2018 Karimli ................ H04W 48/18
2021/0160926 A1* 5/2021 Tao ..................... H04W 74/006

* cited by examiner

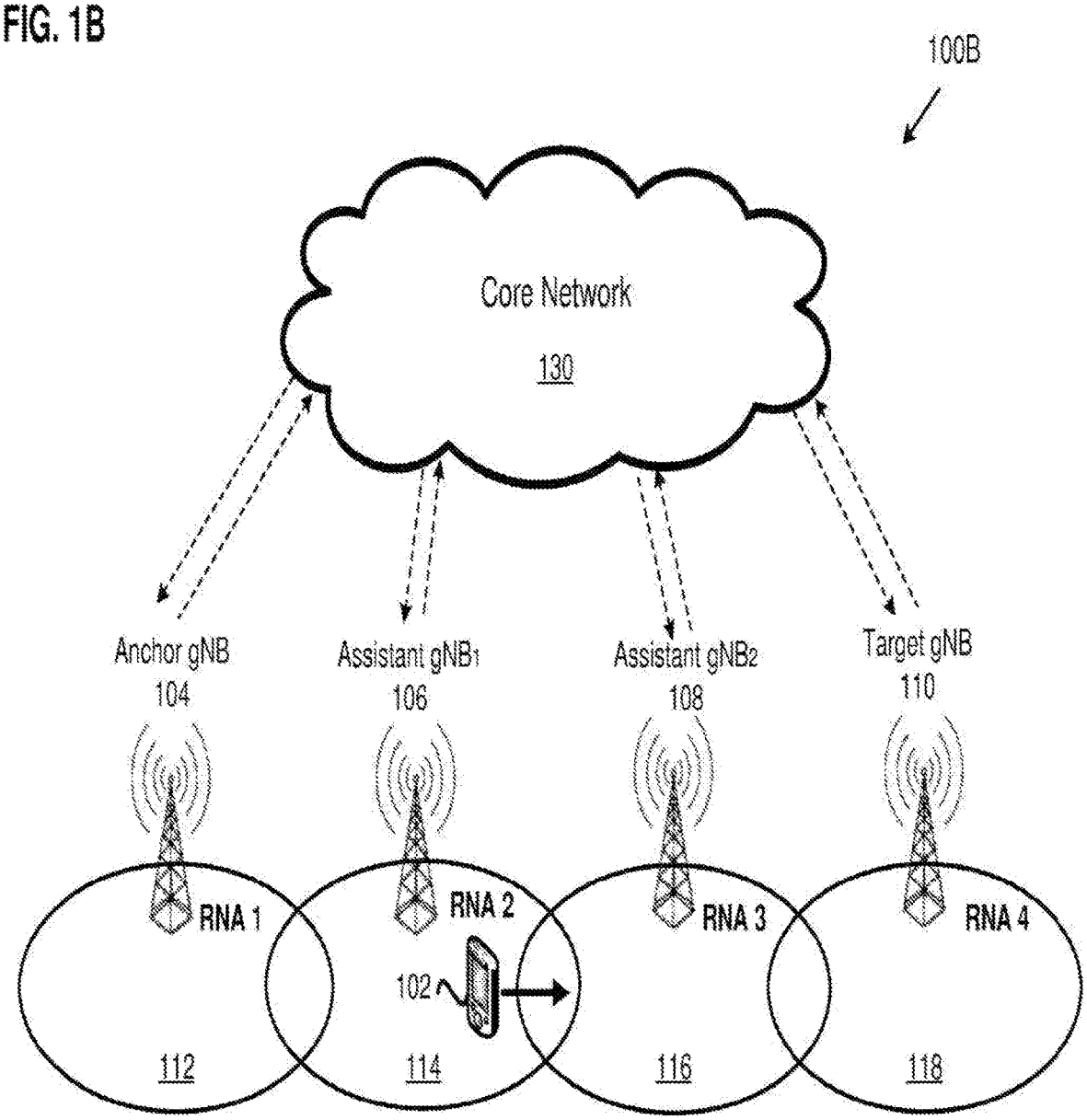

MOBILITY MANAGEMENT FOR RRC_INACTIVE USER EQUIPMENT

CROSS-REFERENCE TO RELATED APPLICATION(S)

This application is a continuation application of U.S. patent application Ser. No. 15/894,074 filed on Feb. 12, 2018, which claims the benefit of and priority to a provisional U.S. Patent Application Ser. No. 62/457,944 filed on Feb. 12, 2017, entitled "MOBILITY MANAGEMENT FOR RRC_INACTIVE USER EQUIPMENTS." The contents of all above-named applications are fully incorporated herein by reference for all purposes.

FIELD

The present disclosure generally relates to wireless communication methods, and more particularly, to user equipment initiated radio access network (RAN) based notification area (RNA) update procedures for the next generation wireless communication networks.

BACKGROUND

The 3rd Generation Partnership Project (3GPP) has introduced a new radio resource control (RRC) state: RRC_INACTIVE state, for the next generation (e.g., 5th generation (5G)) wireless communication networks. RRC_INACTIVE state aims to achieve power saving with acceptable access latency, and is suitable especially for small data transmission such as machine type communications (MTC) scenarios. When a UE is in RRC_INACTIVE state, the 5G access network (5G-AN) (e.g., including the next generation radio access network (NG-RAN) and/or non-3GPP access network connecting to a 5G core network) and the UE store the Access Stratum (AS) context (e.g., UE context) separately. In addition, when the UE is in RRC_INACTIVE state, the UE does not have an RRC connection with the 5G-AN, although the 5G-AN keeps a connection with the next generation core network (e.g., 5G Core Network (5GC)). Other characteristics of RRC_INACTIVE state have been under discussion. For example, in RRC_INACTIVE state, the connection between the core network and the radio access network can be maintained, the radio access network can trigger paging of UEs, and no dedicated resources are allocated to the UEs. As a whole, a UE in RRC_INACTIVE state (e.g., an RRC_INACTIVE UE) may incur minimum signaling, minimum power consumption, and minimum resource costs in the core network (e.g., 5GC) and/or the radio access network (e.g., 5G-AN).

A RAN-based notification area (RNA) may allow the next generation core network (e.g., 5GC) and the next generation radio access network (e.g., 5G-AN) to know the rough location of an RRC_INACTIVE UE. The RNA may include one or more cells, one or more RAN areas, one or more tracking areas, or any combination thereof. The RNA is UE-specific and configurable by the 5G-AN (e.g., by NG-RAN having one or more next generation node Bs (gNBs) and/or one or more next generation evolved node Bs (ng-eNBs)) using dedicated signaling. It is important for the next generation radio access network (e.g., 5G RAN, 5G-AN) to be aware of the RRC_INACTIVE UE moving from one RNA to another, and update the RRC_INACTIVE UE's RNA. It should be noted that the RNA update may be different from a core network level location update or a tracking area update, as an RNA is smaller than, equal to, or greater than a tracking area.

When a UE is in RRC_INACTIVE state, the core network knows the UE's location within an RNA and the UE can move within that RNA without notifying the core network. However, without the proper mobility management, when an RRC_INACTIVE UE is moving out of the coverage of its anchor gNB, the UE context is not transferred accordingly. Moreover, without the proper mobility management, when the UE moves out of the RNA of its anchor gNB, the anchor gNB cannot find the RRC_INACTIVE UE. As a result, the RRC_INACTIVE UE cannot quickly reestablish or resume an RRC connection to a target gNB because the target gNB is out of the RNA of the anchor gNB, and does not have the UE context or a connection to the CN. In addition, if the UE moving speed is high or the RNA is small, the UE context transfer and RNA update can become more frequent and cause more overhead. Furthermore, incurring frequent UE context transfer from one gNB to another in the same RNA, which does not need the UE context for DL/UL data transmission, can also cause extra overhead.

Thus, there is a need in the art for UE initiated RNA update procedures to inform the anchor gNB that the RRC_INACTIVE UE has moved out of its RNA, to keep the UE context information at least in one gNB of an RNA, and/or to allow the RRC_INACTIVE UE to quickly reestablish or resume an RRC connection with a target gNB for DL/UL transmission, even when the target gNB is out of the RNA of the anchor gNB and does not previously have the UE context or a connection to the CN.

SUMMARY

The present disclosure is directed to mobility management for RRC_INACTIVE UEs.

According to an aspect of the present disclosure, a method for RNA update for an RRC_INACTIVE UE in an RRC_INACTIVE state is provided. The method includes receiving, by the RRC_INACTIVE UE in the RRC_INACTIVE state, a first list of RAN area identities (IDs) from a first cell; receiving, by the RRC_INACTIVE UE in the RRC_INACTIVE state, identification information broadcast by a second cell, the identification information including a RAN area ID of the second cell and a cell ID of the second cell; and transmitting, by the RRC_INACTIVE UE in the RRC_INACTIVE state, at least one of an inactive-radio network temporary identifier (I-RNTI) and a cell ID of the first cell to the second cell, after determining that the RAN area ID of the second cell does not belong to the first list of RAN area IDs.

According to an aspect of the present disclosure, a base station for RNA update is provided. The base station includes a memory and at least one processor coupled to the memory. The at least one processor is configured to transmit identification information of a second cell to an RRC_INACTIVE UE in an RRC_INACTIVE state, the identification including a RAN area ID of the second cell and a cell ID of the second cell; and receive, from the RRC_INACTIVE UE in the RRC_INACTIVE state, at least one of a first I-RNTI and a cell ID of a first cell during an RNA update procedure with the RRC_INACTIVE UE in the RRC_INACTIVE state.

According to an aspect of the present disclosure, a UE in an RRC_INACTIVE state for RNA update is provided. The UE includes a memory and at least one processor coupled to the memory. The at least one processor is configured to receive a first list of RAN area IDs from a first cell; receive identification information broadcast by a second cell, the identification information including a RAN area ID of the second cell and a cell ID of the second cell; and transmit at least one of an I-RNTI and a cell ID of the first cell to the second cell, after determining that the RAN area ID of the second cell does not belong to the first list of RAN area IDs.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 1B shows a schematic diagram of an RRC_INACTIVE UE moving from an anchor gNB in a first RNA toward a target gNB in a second RNA through multiple RAN-based notification areas, according to an exemplary implementation of the present application.

DETAILED DESCRIPTION

Figure 1A:
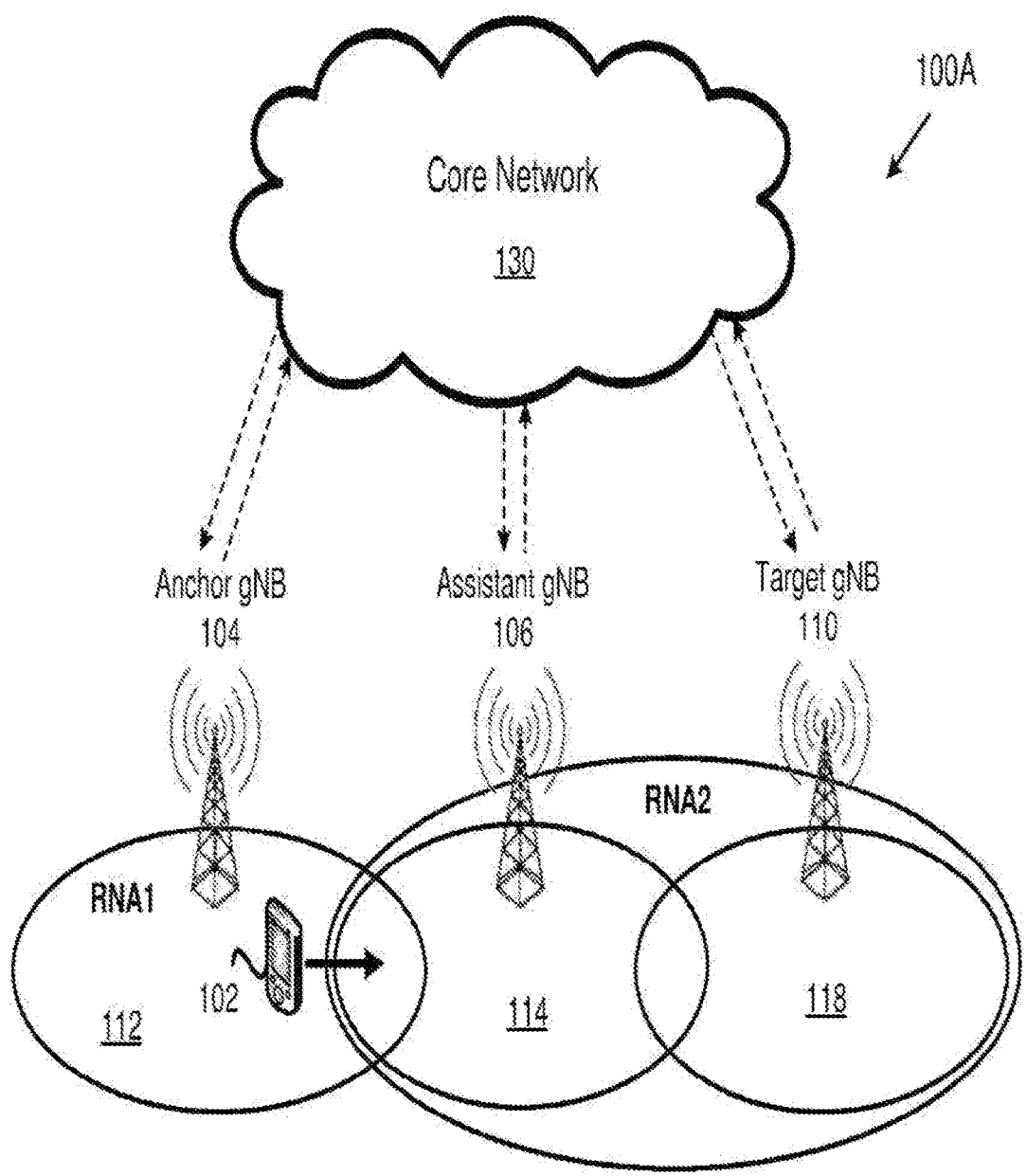
FIG. 1A shows a schematic diagram of an RRC_INACTIVE UE moving from an anchor gNB in a first RNA toward a target gNB in a second RNA through a single assistant gNB in the second RNA, according to an exemplary implementation of the present application.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GSM Enhanced Data rates for GSM Evolution (EDGE) radio access Network (GERAN), a ng-eNB as in an E-UTRAN base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above-mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used for NR. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services.

In various implementations of the present application, UE context within a serving gNB contains information regarding roaming and access restrictions which were provided either at connection establishment or at the last tracking area update. The UE context may include, but is not limited to, UE Aggregate Maximum Bit Rate, the received Handover Restriction List, the received UE Security Capabilities, the received Security Key, etc. In addition, I-RNTI (inactive-radio network temporary identifier) is a unique identification used to identify the UE context for RRC_INACTIVE UE. In various implementations of the present application, the I-RNTI may be included in an RRC resume ID. In various implementation of the present application, the I-RNTI may include the required information to identify the UE context for RRC_INACTIVE UE. The required information may also be included in the RRC resume ID.

In various implementations of the present application, an anchor gNB may be the last serving gNB of a UE, before the UE transitioned to RRC_INACTIVE state. The anchor gNB may keep the UE context and the UE-associated connection with the core network (e.g., serving AMF (Access & Mobility management Function) and/or UPF (User Plane Function)). The UE in RRC_INACTIVE state may remain in Connection Management (CM)-CONNECTED, and may move within an RNA without notifying the RAN (e.g., NG-RAN). However, when the RRC_INACTIVE UE moves out of the RNA in which the anchor gNB is situated, the RRC_INACTIVE UE may initiate an RNA update, among other things, to notify the anchor gNB. In some other embodiments, when the RRC_INACTIVE UE moves within the RNA where the anchor gNB is situated, in some situations (e.g., a timer expires), the RRC_INACTIVE UE may initiate an RNA update, among other things, to notify the anchor gNB or another gNB within the RNA on which the RRC_INACTIVE UE now camps.

In various implementations of the present application, an assistant gNB may be a gNB other than the anchor gNB. The RRC_INACTIVE UE may camp on the assistant gNB. The assistant gNB may be in the same RNA or in a different RNA than the RNA in which the anchor gNB is situated. The assistant gNB may notify the anchor gNB of the UE's presence in its RNA. The assistant gNB may have the UE's RAN area ID, RNA ID, or the UE's RAN notification list, which includes a list of cell IDs, a list of cells, a list of RAN area IDs, a list of RAN areas, a list of tracking area IDs, or any combination thereof. The assistant gNB may also update the RNA to the UE. In some embodiments, the RAN area ID may include at least one of the tracking area identity and RAN area code (RANAC).

A target gNB may be a gNB other than the anchor gNB. The RRC_INACTIVE UE may camp on the target gNB. The target gNB may be in the same RNA or in a different RNA than the RNA in which the anchor gNB is situated. The RRC_INACTIVE UE may attempt to access the target gNB. Upon successfully retrieving the UE Context of the RRC_INACTIVE UE from the anchor gNB (e.g., through one or more assistant gNB), the target gNB may become the serving gNB for downlink (DL) and/or uplink (UL) transmission. It should be noted that, in various implementations of the present application, either the anchor gNB or the target gNB can also be the assistant gNB.

As described in various implementations of the present application, a UE may receive cell IDs broadcast by an assistant gNB or a target gNB. However, it should be understood that cell ID is just an example of what a RAN notification list may include. As described herein, a RAN notification list may also include RAN area IDs, tracking area IDs, etc. In some embodiments, the RAN notification list includes the RAN area IDs, thus, the gNBs may broadcast their RAN area IDs. In some embodiments, the RAN notification list includes the tracking area IDs, thus, the gNBs may broadcast their tracking area IDs.

FIG. 1A shows a schematic diagram of an RRC_INACTIVE UE moving from an anchor gNB in a first RNA toward a target gNB in a second RNA through a single assistant gNB in the second RNA, according to an exemplary implementation of the present application. As shown in FIG. 1A, a wireless communication system 100A includes a user equipment (UE) 102, an anchor gNB 104 having a gNB coverage area 112, an assistant gNB 106 having a gNB coverage area 114, and a target gNB 110 of the UE 102 having a gNB coverage area 118, where the anchor gNB 104, assistant gNB 106, and target gNB 110 can access a core network (CN) 130, such as a next generation core network (e.g., 5GC). It is noted that the anchor gNB 104 is within a first RAN-based notification area, RNA1, while the assistant gNB 106 and target gNB 110 are within a second RAN-based notification area, RNA2, that is different from RNA1. In the present exemplary implementation, RNA1 and RNA2 are neighboring RAN-based notification areas. In other exemplary implementations, RNA1 and RNA2 may not be immediately adjacent neighboring RAN-based notification areas.

When the UE 102 is in RRC_INACTIVE state, it does not have an RRC connection with the anchor gNB 104. The UE 102 may remain in connection management (CM) connected (e.g., CM-CONNECTED), and move within an area configured by the NG-RAN, such as an RNA, without a need to notify the NG-RAN. The anchor gNB 104, as the last serving gNB, stores the UE context of the UE 102, and has a connection (e.g., S1-MME in 4G wireless network, UE-associated next generation (NG) connection in a 5G wireless network, such as N2 to AMF and N3 to UPF, etc.) to the CN 130 (e.g., serving AMF and/or UPF). Both the RRC_INACTIVE UE 102 and the anchor gNB 104 keep the UE context, but without an RRC connection between them. In addition, when the UE 102 is in RRC_INACTIVE state, as the RRC_INACTIVE UE 102 is moving away from the gNB coverage area 112 of the anchor gNB 104 under RNA1 to the gNB coverage area 114 of the assistant gNB 106 under RNA2, the anchor gNB 104 may not have knowledge that the UE 102 is leaving or has left its gNB coverage area 112. As such, if without proper cross-RNA (inter-RNA) mobility management, the UE context may not be transferred from the anchor gNB 104 under RNA1 to the assistant gNB 106 and/or the target gNB 110 under RNA2. In addition, if without proper cross-RNA mobility management, when the RRC_INACTIVE UE 102 moves out of RNA1, the anchor gNB 104 may not be able to find the RRC_INACTIVE UE 102.

FIG. 1B shows a schematic diagram of an RRC_INACTIVE UE 102 moving from an anchor gNB 104 in a first RNA (RNA 1) toward a target gNB 110 in a fourth RNA, (RNA 4) through multiple RAN-based notification areas, according to an exemplary implementation of the present application. As shown in FIG. 1B, a wireless communication system 100B includes a user equipment (UE) 102, an anchor gNB 104 having a gNB coverage area 112, a first assistant gNB$_1$ 106 having a gNB coverage area 114, a second assistant gNB$_2$ 108 having a gNB coverage area 116, and a target gNB 110 having a gNB coverage area 118, where the anchor gNB 104, first assistant gNB$_1$ 106, second assistant gNB$_2$ 108, and target gNB 110 can access a CN 130, such as a next generation core network (e.g., 5GC). It is noted that the anchor gNB 104, first assistant gNB₁ 106, second assistant gNB₂ 108, and target gNB 110, are within RNA1, RNA2, RNA3, and RNA4, respectively. That is, the RRC_INACTIVE UE 102 moves from the gNB coverage area 112 of the anchor gNB 104 within RNA1 across multiple assistant gNB coverage areas (e.g., the assistant gNB coverage areas 114 and 116) and/or multiple RNAs (e.g., RNA2 and RNA3) before it needs the target gNB 110 for UL and DL transmission. In particular, as shown in FIG. 1B, the UE 102 is moving from the gNB coverage area 114 of the assistant gNB₁ 106 toward the gNB coverage area 116 of the assistant gNB₂ 108.

Similar to FIG. 1A, when the UE 102 is in RRC_INACTIVE state, it does not have an RRC connection with the anchor gNB 104. The UE 102 may remain in connection management (CM) connected (e.g., CM-CONNECTED), and move within an area configured by the NG-RAN, such as an RNA, without a need to notify the NG-RAN. The anchor gNB 104, as the last serving gNB, stores the UE context of the UE 102, and has a connection (e.g., S1-MME in a 4G wireless network, UE-associated next generation (NG) connection in a 5G wireless network, such as N2 to AMF and N3 to UPF, etc.) to the CN 130 (e.g., AMF and/or UPF). Both the RRC_INACTIVE UE 102 and the anchor gNB 104 keep the UE context, but without an RRC connection between them. In addition, when the UE 102 is in RRC_INACTIVE state, as the RRC_INACTIVE UE 102 is moving from the gNB coverage area 114 of the first assistant gNB₁ 106 under RNA2 to the gNB coverage area 116 of the assistant gNB₂ 108 under RNA3, the anchor gNB 104 and the assistant gNB₁ 106 may not have the knowledge that the UE 102 is leaving or has left the gNB coverage area 114.

As such, without proper cross-RNA mobility management, the UE context may not be transferred from the first assistant gNB₁ 106 under RNA2 to the second assistant gNB₂ 108 under RNA3 and/or the target gNB 110 under RNA4. In addition, without proper cross-RNA mobility management, when the RRC_INACTIVE UE 102 moves out of RNA2, neither the anchor gNB 104 nor the first assistant gNB₁ 106 may be able to find the RRC_INACTIVE UE 102.

Thus, for both the diagram 100A in FIG. 1A and the diagram 100B in FIG. 1B, it is desirable to have one or more UE initiated procedures to transfer the UE context and update the RNA when the RRC_INACTIVE UE 102 moves out of the current RNA, so that the RRC_INACTIVE UE 102 can quickly reestablish or resume an RRC connection with a target gNB 110, even though the target gNB 110 is out of the RNA of the anchor gNB 104 and does not previously have the UE context and/or a connection to the CN 130.

Figure 2:
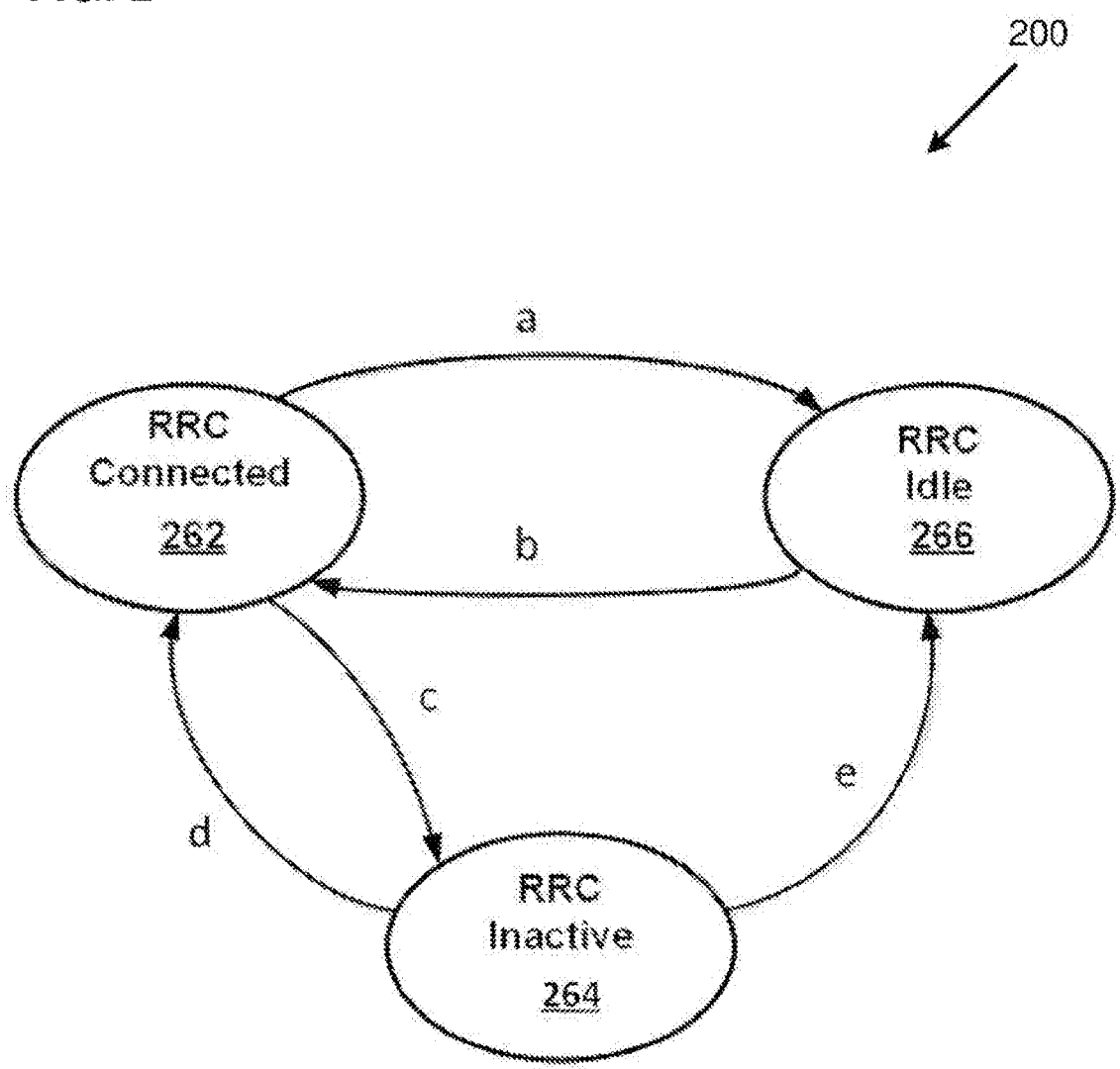
FIG. 2 is an RRC state transition diagram illustrating various RRC state transition procedures that a UE may undergo within a next generation radio access network, according to an exemplary implementation of the present application.

In both FIGS. 1A and 1B, the anchor gNB 104 is a gNB, to which all the data for the RRC_INACTIVE UE 102 routes, because the anchor gNB 104 has a UE-associated connection with the core network 130 (e.g., a S1-MME connection in a 4G network, or a UE-associated next generation (NG) connection in a 5G wireless network, such as N2 to AMF and N3 to UPF). For implementations of the present application, it is assumed that RRC_INACTIVE state comes after RRC_CONNECTED state, as shown in FIG. 2. The anchor gNB 104 stores the UE context and maintains a connection (e.g., S1-MME in a 4G wireless network, UE-associated next generation (NG) connection in a 5G wireless network, such as N2 to AMF and N3 to UPF, etc.) to the CN 130 (e.g., AMF and/or UPF). The assistant gNB 106 is the first gNB, on which the RRC_INACTIVE UE 102 camps, in the same or a new RAN based notification area. The assistant gNB 106 may notify the anchor gNB 104 of the UE's 102 presence in its coverage area. The assistant gNB 106 may have the UE's 102 RAN area ID, RNA ID, or the UE's 102 RAN notification list, which includes a list of cell IDs, a list of cells, a list of RAN area IDs, a list of RAN areas, a list of tracking area IDs, or any combination thereof. The assistant gNB 106 may also update the RNA to the UE 102. The target gNB 110 is a gNB, on which the RRC_INACTIVE UE 102 camps, when DL/UL transmission is to happen. It should be noted that the anchor gNB 104 or the target gNB 110 may also be the assistant gNB 106. Moreover, from the UE's 102 perspective, in some embodiments, there is only one anchor gNB 104, which may keep the UE context, a connection to the core network, the UE's 102 assistant gNB 106 cell ID and/or the UE's 102 RAN area ID, RNA ID, or the UE's 102 RAN notification list, which includes a list of cell IDs, a list of cells, a list of RAN area IDs, a list of RAN areas, a list of tracking area IDs, or any combination thereof.

In both FIGS. 1A and 1B, the target gNB 110 and the anchor gNB 104 are not in the same RNA. It should be noted that, from the UE's 102 perspective, in some embodiments, there is only one assistant gNB 106 existent at any given time in one RAN based notification area in both cases depicted in FIGS. 1A and 1B.

Among other differences, FIG. 1A shows a single assistant gNB 106 between the anchor gNB 104 and the target gNB 110, while FIG. 1B shows multiple assistant gNBs (106, 108) and multiple RNAs (RNA 1, RNA 2, RNA 3, RNA 4) between the anchor gNB 104 and the target gNB 110. In FIG. 1A, the RRC_INACTIVE UE 102 is moving out of RNA1 in which the anchor gNB 104 is situated. In FIG. 1B, the RRC_INACTIVE UE 102 is moving out of RNA 2 in which the assistant gNB₁ 106 is situated, instead of RNA 1 in which the anchor gNB 104 is situated as shown in FIG. 1A.

It should be noted that although FIGS. 1A and 1B illustrate embodiments where the anchor gNB 104 is in a different RNA than the assistant gNBs (106, 108) and/or target gNB 110, it should be understood that the present application is not limited to the illustrated scenarios. That is, the RNA update procedures described in the present application may be also applicable when the assistant gNBs (106, 108) and the target gNB 110 are in the same RNA as the anchor gNB 104.

FIG. 2 is an RRC state transition diagram illustrating various RRC state transition procedures that a UE may undergo within a next generation radio access network, according to an exemplary implementation of the present application. The RRC state transition diagram 200 includes RRC_CONNECTED state 262, RRC_INACTIVE state 264, and RRC_IDLE state 266. As shown in FIG. 2, a UE may transition among RRC_CONNECTED state 262, RRC_INACTIVE state 264, and RRC_IDLE state 266 through various procedures (e.g., procedures a, b, c, d, and e). It should be noted that in the RRC state transition diagram 200, a UE may not transition directly from RRC_IDLE state 266 to RRC_INACTIVE state 264. That is, RRC_INACTIVE state 264 always comes after RRC_CONNECTED state 262. For example, the UE may transition from RRC_CONNECTED state 262 to RRC_INACTIVE state 264 through an RRC Suspend procedure (e.g., procedure c). Conversely, the UE may transition from RRC_INACTIVE state 264 to RRC_CONNECTED state 262 through an RRC Resume procedure (e.g., procedure d).

In the present application, a next generation radio access network (e.g., 5G-RAN) may configure a UE to send an RRC Resume Request during a 2-step random access channel (RACH) procedure as described with reference to FIG. 3A, or a 4-step RACH procedure as described with reference to FIG. 3B. It is noted that the term "RACH procedure(s)" and the term "RA procedure(s)" may be interchangeably utilized in the present disclosure.

Figure 3A:
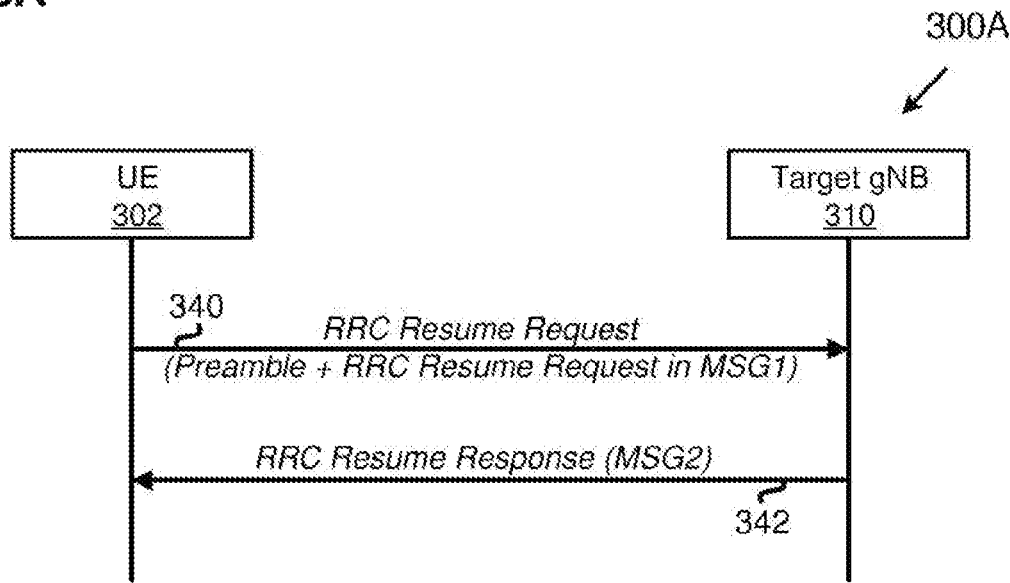
FIG. 3A is a diagram illustrating an RRC Resume procedure achieved by a 2-step radio access procedure, according to an exemplary implementation of the present application.

FIG. 3A is a diagram illustrating an RRC Resume procedure 300A achieved by a 2-step radio access procedure, according to an exemplary implementation of the present application. Diagram 300A includes a UE 302 and a target gNB 310. In some implementations, the target gNB 310 may be substantially similar to any of the assistant gNB/gNB$_1$ 106, assistant gNB$_2$ 108, and target gNB 110 shown in FIGS. 1A and 1B. In action 340, the UE 302 may multiplex a preamble sequence in MSG 1 with an RRC Resume Request in MSG 1 (e.g., RRC Connection Resume Request kind of message, RRC Connection Resume Request message, RRC Resume Request message). The target gNB 310 may receive the RRC Resume Request in the MSG1 of random access (RA) procedure. In some implementations, for small packet transmission, the UE 302 may indicate that "the cause of RRC Resume Request=UL small packet transmission," and the small data may be multiplexed with the preamble and the RRC Resume Request message in the MSG1. In action 342, the target gNB 310 may deliver an RRC Resume Response to the UE 302 in the MSG2 (e.g., RRC Resume message, RRC Connection Resume message) of RA procedure. For UL small packet transmission, the target gNB 310 may provide an acknowledge (ACK)/non-acknowledgement (NACK) message in the MSG2 to indicate whether the target gNB 310 has received the small packet in MSG1 successfully. If the UE 302 successfully completes the RRC resume procedure, the UE 302 may further send MSG3 (e.g., RRC Resume Complete message, RRC Connection Resume Complete message) to the target gNB 310. Although the messages in a 2-step radio access procedure are identified as "MSG1" and "MSG2" in FIG. 3A, in the present disclosure, the "MSG1" and "MSG2" in a 2-step radio access procedure may also refer to "Message A (MSGA)" and "Message B (MSGB)," respectively.

Figure 3B:
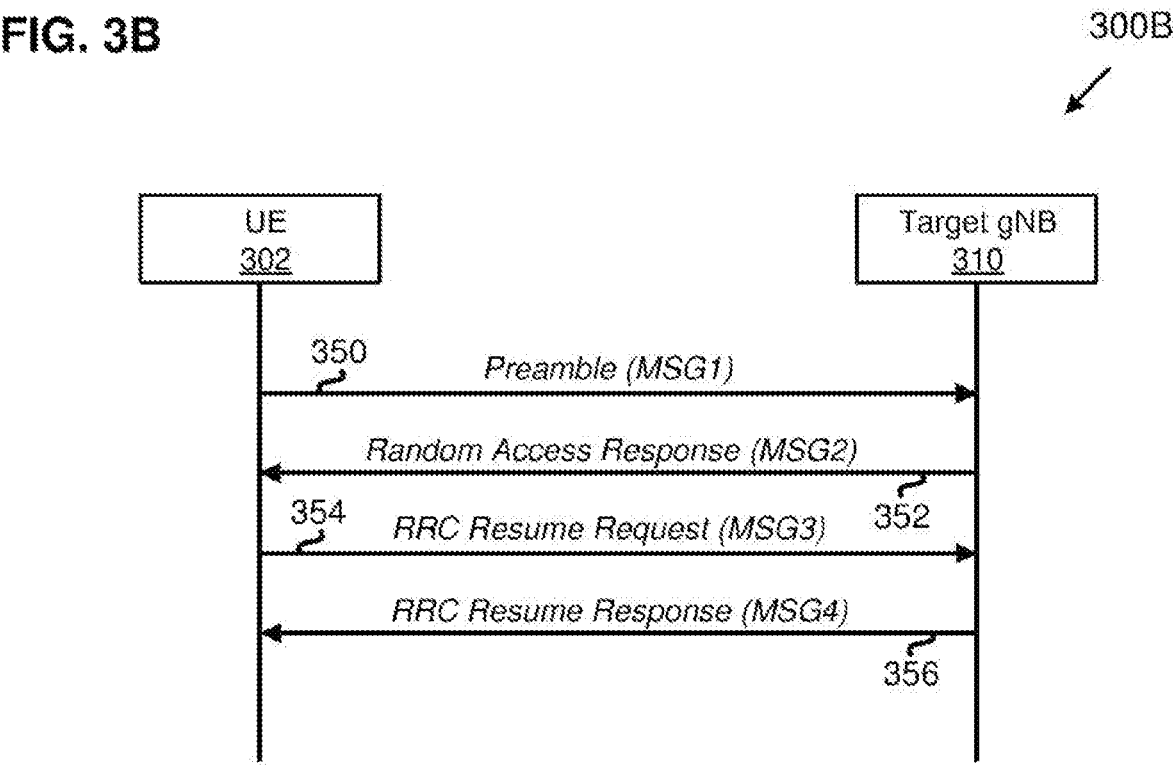
FIG. 3B is a diagram illustrating an RRC Resume procedure achieved by a 4-step radio access procedure, according to an exemplary implementation of the present application.

FIG. 3B is a diagram illustrating an RRC Resume procedure 300B achieved by a 4-step radio access procedure, according to an exemplary implementation of the present application. Diagram 300B includes a UE 302 and a target gNB 310. In action 350, the UE 302 may send a Preamble (e.g., a random access preamble) to the target gNB 310 through MSG1. In action 352, the target gNB 310 may send a Random Access Response in MSG2, if the target gNB 310 decodes MSG1 successfully. In MSG2, the target gNB 310 may send configured radio resource information for the UE 302 to deliver MSG3 (e.g., RRC Connection Resume Request kind of message, RRC Connection Resume Request message, RRC Resume Request message). In action 354, the UE 302 may deliver an RRC Resume Request in MSG3 to the target gNB 310. In some implementations, for small packet transmission, the UE 302 may indicate that "the cause of RRC Resume Request=UL small packet transmission," and the small data may be multiplexed with the RRC Resume Request message in MSG 3. In some embodiments, the UE 302 may indicate that the "the cause of RRC Resume Request=RNA update". In action 356, the target gNB 310 may deliver an RRC Resume Response through MSG4 (e.g., RRC Resume message, RRC Connection Resume message) to the UE 302. For UL small packet transmission, the target gNB 310 may provide an ACK/NACK message in the MSG4 to indicate whether the target gNB 310 has received the small packet in MSG3 successfully. If the UE 302 successfully completes the RRC resume procedure, the UE 302 may further send MSG5 (not explicitly shown) (e.g., RRC Resume Complete message, RRC Connection Resume Complete message) to the target gNB 310. It should be noted that each of the 2-step and 4-step RA procedures can be applied to the RNA update procedures, for example, in both cases depicted in FIGS. 1A and 1B.

Case 1

UE Initiated RAN-Based Notification Area Update

A UE initiated RAN-based notification area (RNA) update enables an RRC_INACTIVE UE 302 to quickly reestablish or resume an RRC connection with a target gNB 310 when needed (e.g., inter-RNA update, intra-RNA update, periodic RNA update, etc.). In one implementation, an RRC_INACTIVE UE 302 may initiate an RNA update (e.g., an inter-RNA update), as the RRC_INACTIVE UE 302 moves out of an anchor gNB and/or an assistant gNB (FIGS. 1A and 1B), even when the target gNB 310 is out of the RNA in which the anchor gNB or the assistant gNB is situated and does not previously have the UE context or a connection to a core network. In another implementation, the RRC_INACTIVE UE 302 may initiate an RNA update (e.g., an intra-RNA update), as the RRC_INACTIVE UE 302 moves from an anchor gNB to a target gNB 310 within the same RNA. In another implementation, an RRC_INACTIVE UE 302 may initiate RNA update periodically. For example, the UE 302 initiates an RNA update procedure, when a timer expires.

Figure 4:
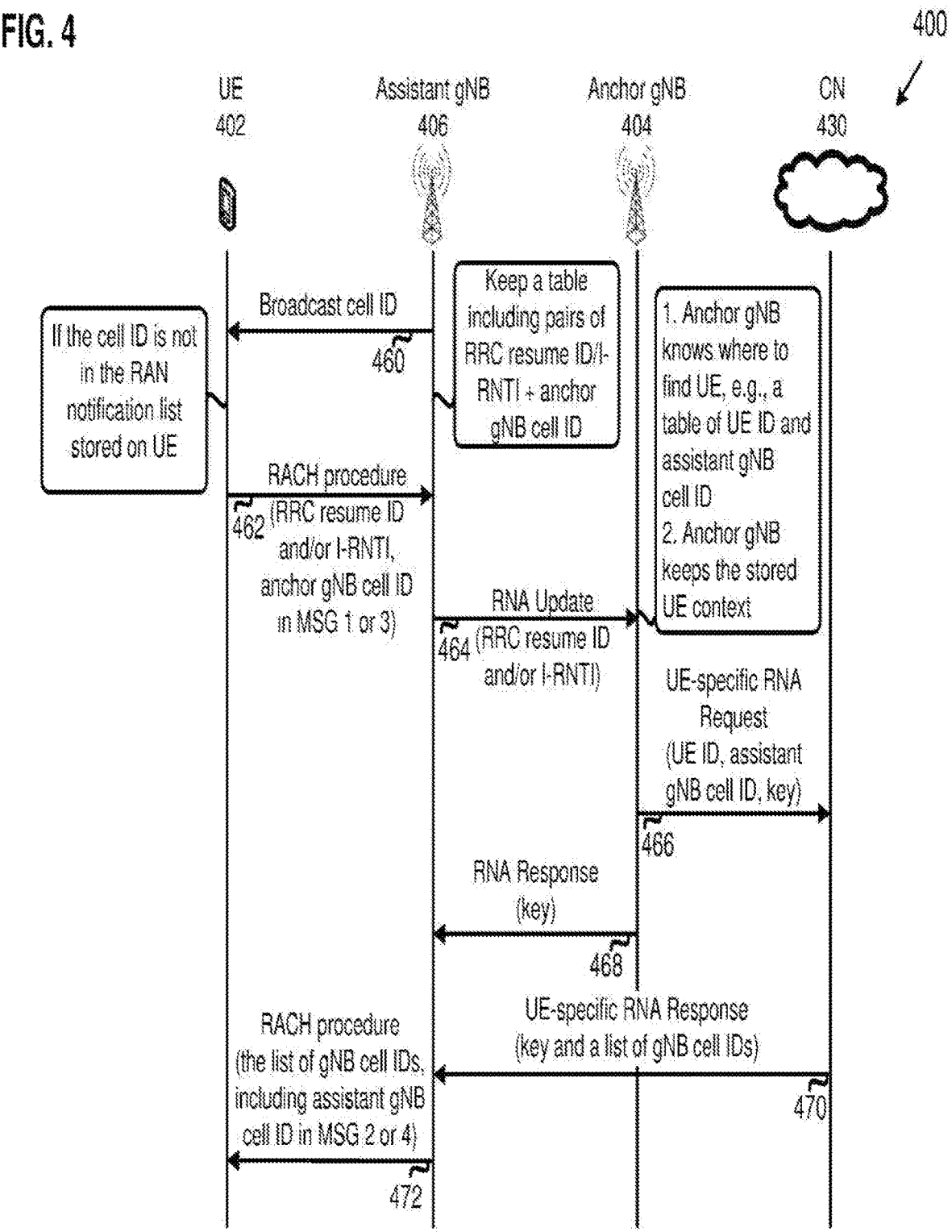
FIG. 4 is a diagram illustrating a UE initiated RNA update procedure for an RRC_INACTIVE UE moving within or out of the RNA in which the anchor gNB is situated, according to an exemplary implementation of the present application.

Case 1-A: RRC_INACTIVE UE Moving within or Out of RNA in which Anchor gNB is Situated FIG. 4 is a diagram illustrating a UE initiated RNA update procedure for an RRC_INACTIVE UE moving within or out of the RNA in which the anchor gNB is situated, according to an exemplary implementation of the present application. Diagram 400 includes a UE 402, an anchor gNB 404, an assistant gNB 406, and a CN 430 (e.g., a 5GC). In the present implementation, the UE 402, anchor gNB 404, assistant gNB 406, and CN 430 in FIG. 4 may substantially correspond to the UE 102, anchor gNB 104, assistant gNB 106, and CN 130, respectively, in FIG. 1A. In another implementation, the UE 402 may move from the anchor gNB 404 to the assistant gNB 406, where the anchor gNB 404 and the assistant gNB 406 are in the same RNA. In such case, the UE 402 may initiate an RNA update procedure periodically, for example, when a timer expires.

Diagram 400 also shows actions 460, 462, 464, 466, 468, 470, and 472, for a UE initiated RNA update procedure as the RRC_INACTIVE UE 402 is moving within or out of the RNA in which the anchor gNB 404 is situated. In action 460, the RRC_INACTIVE UE 402 receives the assistant gNB 406's cell ID (the assistant gNB 406's RAN area ID or the assistant gNB 406's tracking area ID) broadcast from the assistant gNB 406. When the RRC_INACTIVE UE 402 compares the assistant gNB 406's cell ID (the assistant gNB 406's RAN area ID or the assistant gNB 406's tracking area ID) with the cell IDs (RAN area IDs or tracking area IDs) stored in its RAN notification list, the RRC_INACTIVE UE 402 may determine that it is moving or has moved out of the original RNA in which the anchor gNB 404 is situated. As a result, the RRC_INACTIVE UE 402 initiates an RNA update, to inform the anchor gNB 404 about the exit of the RRC_INACTIVE UE 402 and to update the RAN notification list.

In action 462, after determining that the received broadcast cell ID (RAN area ID or tracking area ID) from the assistant gNB 406 is not on its RAN notification list, the RRC_INACTIVE UE 402 initiates a random access channel (RACH) procedure with the assistant gNB 406. The RACH procedure may be either the 2-step RACH procedure or the 4-step RACH procedure as described with reference to FIGS. 3A and 3B, respectively. The RRC_INACTIVE UE 402 may send its RRC resume ID and/or I-RNTI and the anchor gNB 404's cell ID (RAN area ID or tracking area ID) either in MSG1 of the 2-step RACH procedure shown in FIG. 3A, or in MSG1/MSG 3 of the 4-step RACH procedure shown in FIG. 3B. The assistant gNB 406 may keep a table including a list of RRC resume IDs and/or I-RNTIs and anchor gNB cell IDs (RAN area IDs or tracking area IDs) in matching pairs, as the assistant gNB 406 may be an assistant gNB for multiple RRC_INACTIVE UEs.

In action 464, upon receiving the RRC resume ID and/or I-RNTI from the RRC_INACTIVE UE 402, which is new to the assistant gNB 406, the assistant gNB 406 sends an RNA Update message to the anchor gNB 404, where the RNA Update message includes the RRC resume ID and/or I-RNTI from the UE 402. The anchor gNB 404 receives the RNA Update message from the assistant gNB 406 and keeps a table of UE ID and assistant gNB 406's cell ID (RAN area ID or tracking area ID), so that the anchor gNB 404 knows where the RRC_INACTIVE UE 402 is located. The anchor gNB 404 also keeps the stored UE context.

In action 466, the anchor gNB 404 sends a UE-specific RNA Request to the CN 430 (e.g., 5G-CN, 5GC or NG-CN), where the UE-specific RNA Request includes the RRC_INACTIVE UE 402's UE ID and the assistant gNB 406's cell ID (RAN area ID or tracking area ID), and a key. In one implementation, the key can be the security key in the UE context. In another implementation, the key can be in other formats, such as UE-specific IDs that the anchor gNB 404 creates and delivers to both the CN 430 via a UE-specific RNA Request and the assistant gNB 406 using an RNA Response. The key is subsequently used by the assistant gNB 406 to ensure the integrity of the CN 430, and to confirm that a received UE-specific RNA Response from the CN 430 and a received RNA Response from the anchor gNB 404 correspond to the UE 402.

In action 468, the anchor gNB 404 sends an RNA Response including the key to the assistant gNB 406. In action 470, the CN 430 sends a UE-specific RNA Response including the key and a new RNA having a list of gNB cell IDs (a list of gNB RAN area IDs or a list of gNB tracking area IDs) to the assistant gNB 406. For example, based on the received UE ID, the CN 430 checks the UE context and determines the new RNA for the RRC_INACTIVE UE 402. When the key in the received RNA Response from the anchor gNB 404 matches the key in the received UE-specific RNA Response from the CN 430, the assistant gNB 406 performs the remaining actions of the RACH procedure. In action 472, the assistant gNB 406 transmits the new RNA having the list of gNB cell IDs (e.g., with the assistant gNB 406's cell ID) (the list of gNB RAN area IDs (e.g., with the assistant gNB 406's RAN area ID), or the list of gNB tracking area IDs (e.g., with the assistant gNB 406's tracking area ID)), to the RRC_INACTIVE UE 402, using either MSG2 of the 2-step RACH procedure shown in FIG. 3A, or MSG2/MSG4 of the 4-step RACH procedure shown in FIG. 3B.

It is noted that, in the present implementation, the RAN notification list is determined by the CN 430. The present implementation also utilizes key mapping between the assistant gNB 406 and the CN 430 to ensure the integrity of the CN 430, and to confirm that the received UE-specific RNA Response from the CN 430 and the RNA Response from the anchor gNB 404 correspond to the UE 402.

Figure 5:
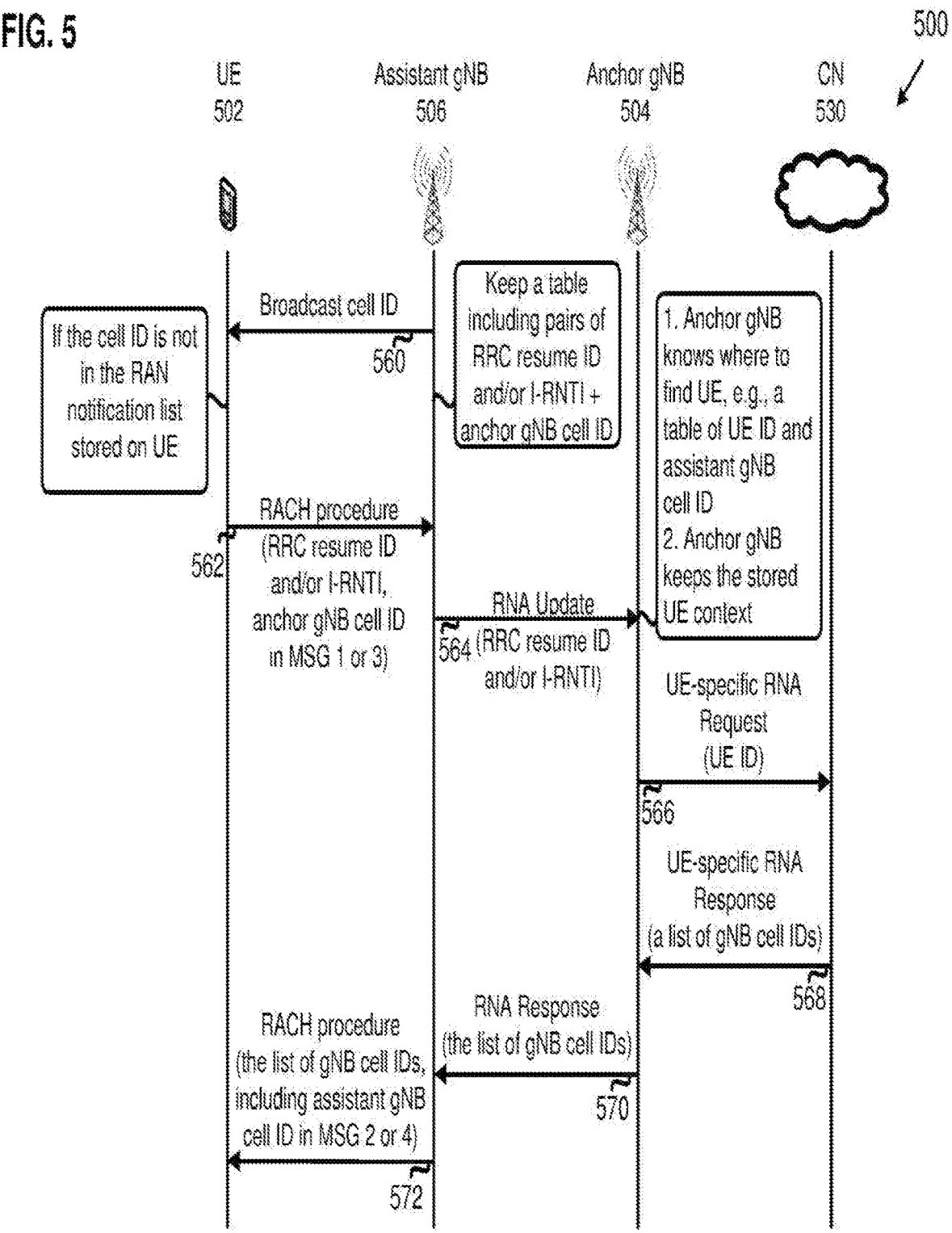
FIG. 5 is a diagram illustrating a UE initiated RNA update procedure for an RRC_INACTIVE UE moving within or out of the RNA in which the anchor gNB is situated, according to an exemplary implementation of the present application.

FIG. 5 is a diagram illustrating a UE initiated RNA update procedure for an RRC_INACTIVE UE moving within or out of the RNA in which the anchor gNB is situated, according to an exemplary implementation of the present application. Diagram 500 includes a UE 502, an anchor gNB 504, an assistant gNB 506, and a CN 530. In the present implementation, the UE 502, anchor gNB 504, assistant gNB 506, and CN 530 in FIG. 5 may substantially correspond to the UE 102, anchor gNB 104, assistant gNB 106, and core network (CN) 130 in FIG. 1A, respectively. In another implementation, the UE 502 may move from the anchor gNB 504 to the assistant gNB 506, where the anchor gNB 504 and the assistant gNB 506 are in the same RNA. In such case, the UE 502 may initiate an RNA update procedure periodically, for example, when a timer expires.

Diagram 500 also shows actions 560, 562, 564, 566, 568, 570, and 572 for a UE initiated RNA update procedure as the RRC_INACTIVE UE 502 is moving within or out of the RNA in which the anchor gNB 504 is situated. In the present implementation, the actions 560, 562, 564, and 572 may be substantially similar to the actions 460, 462, 464, and 472, respectively, as shown in FIG. 4. Different from FIG. 4, in action 566, the anchor gNB 504 sends a UE-specific RNA Request to the CN 530 (e.g., 5GC, 5G CN), where the UE-specific RNA Request includes the RRC_INACTIVE UE 502's UE ID (without the assistant gNB 506's cell ID (RAN area ID or tracking area ID) or a key). In action 568, the CN 530 sends a UE-specific RNA Response including a new RNA having a list of gNB cell IDs (a list of gNB RAN area IDs or a list of gNB tracking area IDs) to the anchor gNB 504. For example, based on the received UE ID, the CN 530 checks the UE context and determines the new RNA for the RRC_INACTIVE UE 502. In action 570, the anchor gNB 504 sends an RNA Response including the new RNA having the list of gNB cell IDs (e.g., with the assistant gNB 506's cell ID) (the list of gNB RAN area IDs (e.g., with the assistant gNB 506's RAN area ID), or the list of gNB tracking area IDs (e.g., with the assistant gNB 506's tracking area ID)), to the assistant gNB 506. Thus, in the UE initiated RNA update procedure illustrated in FIG. 5, the anchor gNB 504 forwards or transfers the UE's RAN notification list from the CN 530 to the assistant gNB 506. There is no key mapping between the CN 530 and the assistant gNB 506.

It should be noted that, for implementations of the present application, an RRC_INACTIVE UE's RAN notification list may be determined (1) by a CN, (2) by one or more gNBs, or (3) by a combination of a CN and one or more gNBs. In one implementation, a CN determines the RRC_INACTIVE UE's RAN notification list based on the UE context and/or tracking/registration area configured for the UE. For example, the tracking/registration area may be provided by the CN through AMF to NG-RAN (e.g., gNB). The gNB may take into account the UE tracking/registration area when configuring the RNA. As described above with reference to FIGS. 4 and 5, the RRC_INACTIVE UE 402 and 502's RAN notification lists are determined by the core networks 430 and 530, respectively. In the second approach, one or more gNBs, such as an assistant gNB and/or an anchor gNB, can determine the RRC_INACTIVE UE's RAN notification list based on the UE context and the gNB's connection capability to other gNBs. For example, some gNBs may belong to a blacklist of the assistant/anchor gNB, which means that the assistant/anchor gNB cannot communicate with gNBs on its blacklist. Thus, certain cell IDs (RAN area IDs or tracking area ID) on the blacklist may not be included or be removed from the RRC_INACTIVE UE's RAN notification list.

Figure 6:
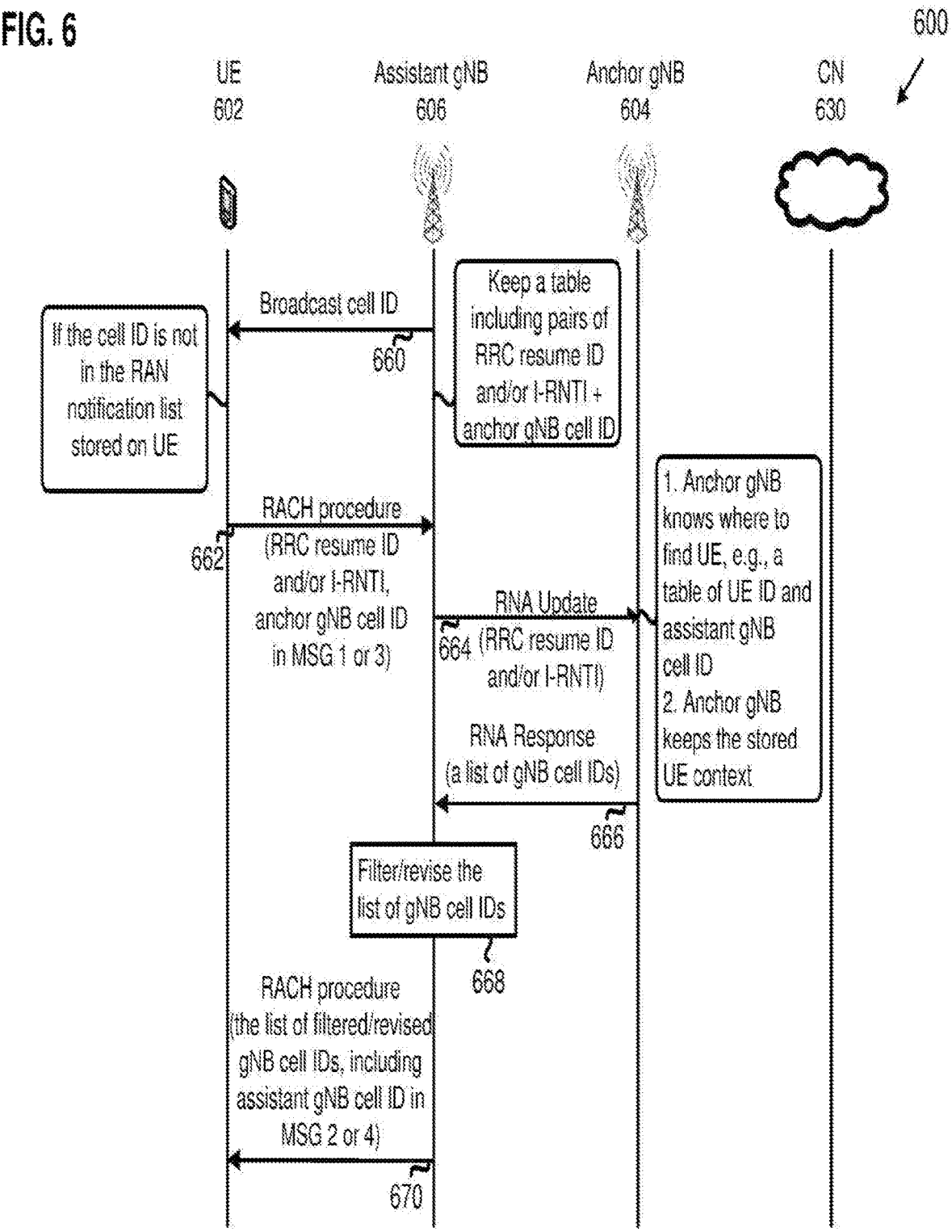
FIG. 6 is a diagram illustrating a UE initiated RNA update procedure for an RRC_INACTIVE UE moving within or out of the RNA in which the anchor gNB is situated, where the RAN notification list is determined by the anchor gNB and/or the assistant gNB, according to an exemplary implementation of the present application.

FIG. 6 is a diagram illustrating a UE initiated RNA update procedure for an RRC_INACTIVE UE moving within or out of the RNA in which the anchor gNB is situated, where the RAN notification list is determined by the anchor gNB and/or the assistant gNB, according to an exemplary implementation of the present application. Diagram 600 includes a UE 602, an anchor gNB 604, an assistant gNB 606, and a CN 630. In the present implementation, the UE 602, anchor gNB 604, assistant gNB 606, and CN 630 in FIG. 6 may substantially correspond to the UE 102, anchor gNB 104, assistant gNB 106, and CN 130, respectively, in FIG. 1A. In another implementation, the UE 602 may move from the anchor gNB 604 to the assistant gNB 606, where the anchor gNB 604 and the assistant gNB 606 are in the same RNA. In such case, the UE 602 may initiate an RNA update procedure periodically, for example, when a timer expires.

Diagram 600 also shows actions 660, 662, 664, 666, 668, and 670 for a UE initiated RNA update procedure as the RRC_INACTIVE UE 602 is moving within or out of the RNA in which the anchor gNB 604 is situated. In the present implementation, the actions 660, 662, and 664 may be substantially similar to the actions 560, 562, and 564, respectively, as shown in FIG. 5. Different from FIG. 5, in action 666, the anchor gNB 604 determines the UE 602's new RAN notification list based on the UE context, and sends the new RAN notification list to the assistant gNB 606. The assistant gNB 606 may filter and/or revise the new RAN notification list based on its connection to other gNBs. For example, the assistant gNB 606 may filter and/or remove the gNB cell IDs (RAN area IDs or tracking area IDs) on the new RAN notification list that is on its blacklist, as indicated in action 668. In action 670, the assistant gNB 606 sends the RAN notification list with the filtered and/or revised gNB cell IDs (RAN area IDs or tracking area IDs) to the UE 602.

In the third approach, a CN and one or more gNBs may determine the RRC_INACTIVE UE's RAN notification list. For example, the CN determines the RRC_INACTIVE UE's RAN notification list based on the UE context and/or tracking area. Then, the one or more gNBs, such as an assistant gNB and/or an anchor gNB, can modify the RRC_INACTIVE UE's RAN notification list determined by the CN based on the UE context and the assistant gNB and/or anchor gNB's connection capability to other gNBs. For example, some gNBs may belong to a blacklist of the assistant/anchor gNB, which means that the assistant/anchor gNB cannot communicate with gNBs on its blacklist. Thus, certain cell IDs (RAN area IDs or tracking area IDs) on the blacklist may not be included or be removed from the RRC_INACTIVE UE's RAN notification list.

Figure 7:
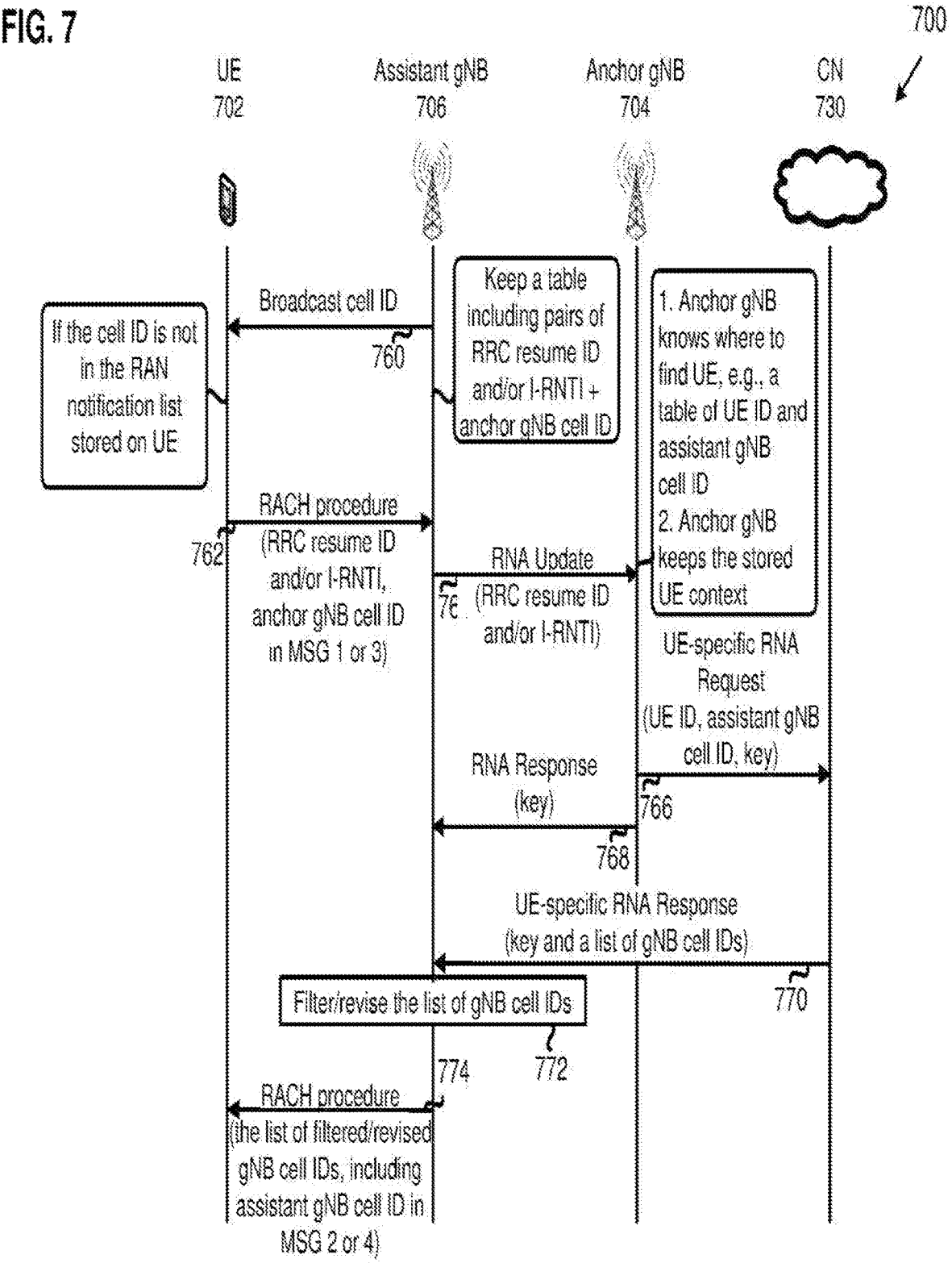
FIG. 7 is a diagram illustrating a UE initiated RNA update procedure for an RRC_INACTIVE UE moving within or out of the RNA in which the anchor gNB is situated, where the RAN notification list is determined by a hybrid of the CN and the assistant gNB with key mapping between the CN and the assistant gNB, according to an exemplary implementation of the present application.

FIG. 7 is a diagram illustrating a UE initiated RNA update procedure for an RRC_INACTIVE UE moving within or out of the RNA in which the anchor gNB is situated, where the RAN notification list is determined by a hybrid of the CN and the assistant gNB with key mapping between the CN and the assistant gNB, according to an exemplary implementation of the present application. Diagram 700 includes a UE 702, an anchor gNB 704, an assistant gNB 706, and a CN 730. In the present implementation, the UE 702, anchor gNB 704, assistant gNB 706, and CN 730 in FIG. 7 may substantially correspond to the UE 102, anchor gNB 104, assistant gNB 106, and core network (CN) 130, respectively, in FIG. 1A. In another implementation, the UE 702 may move from the anchor gNB 704 to the assistant gNB 706, where the anchor gNB 704 and the assistant gNB 706 are in the same RNA. In such case, the UE 702 may initiate an RNA update procedure periodically, for example, when a timer expires.

Diagram 700 shows actions 760, 762, 764, 766, 768, 770, 772, and 774 for a UE initiated RNA update procedure as the RRC_INACTIVE UE 702 is moving within or out of the RNA in which the anchor gNB 704 is situated. In the present implementation, the actions 760, 762, 764, 766, 768, and 770 may be substantially similar to the actions 460, 462, 464, 466, 468, and 470, respectively, as shown in FIG. 4. Different from FIG. 4, in action 772, after the CN 730 determines the UE 702's new RAN notification list and sends the new RAN notification list to the assistant gNB 706, the assistant gNB 706 may filter and/or revise the new RAN notification list based on its connection capability to other gNBs. For example, the assistant gNB 706 may filter and/or remove the gNB cell IDs (RAN area IDs or tracking area IDs) on the new RAN notification list that is on its blacklist, as indicated in action 772. In action 774, the assistant gNB 706 sends the RAN notification list with the filtered and/or revised gNB cell IDs (RAN area IDs or tracking area IDs) to the UE 702.

Figure 8:
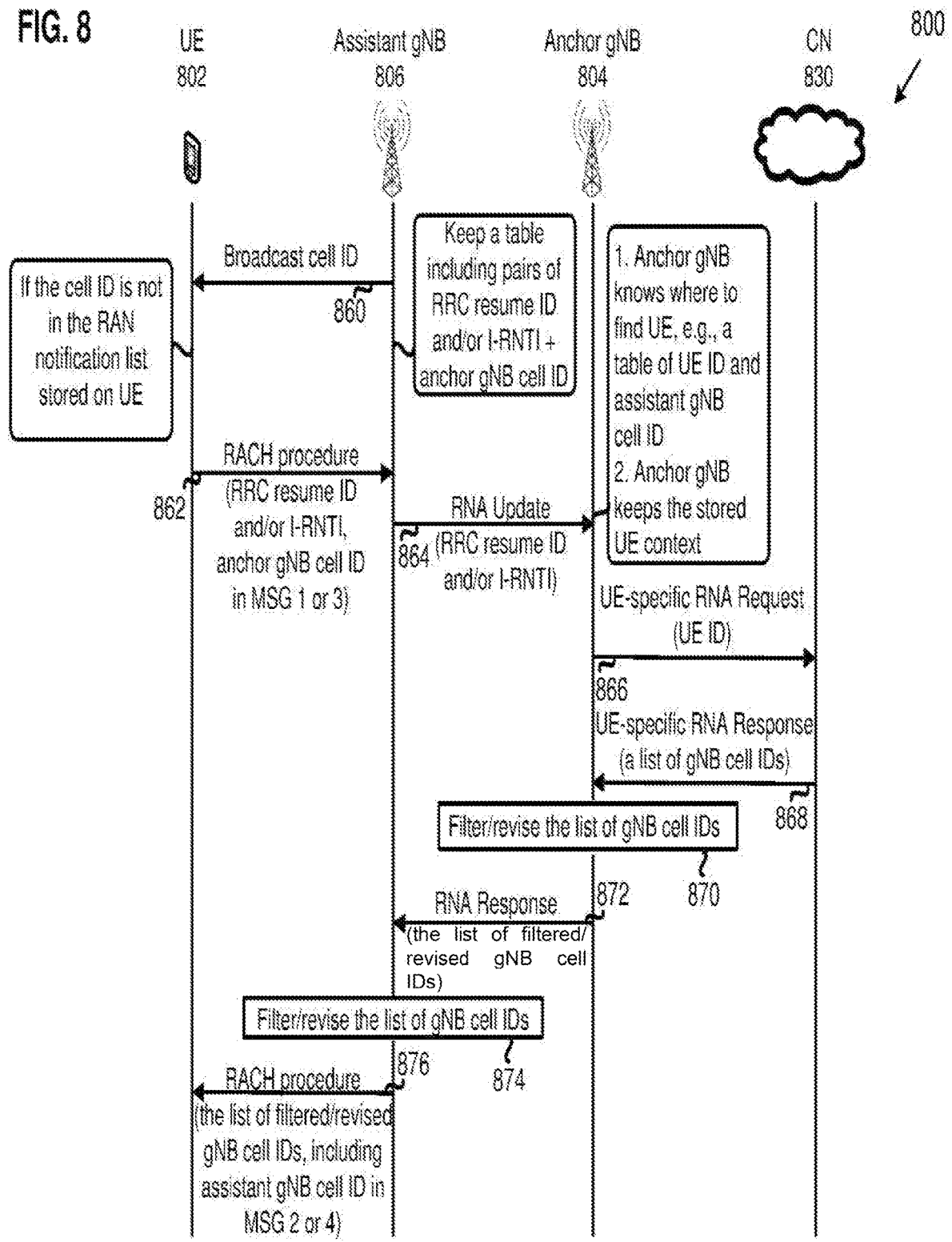
FIG. 8 is a diagram illustrating a UE initiated RNA update procedure for an RRC_INACTIVE UE moving within or out of the RNA in which the anchor gNB is situated, where the RAN notification list is determined by the CN and the anchor gNB and/or the assistant gNB, with the anchor gNB forwarding the RAN notification list to the assistant gNB, according to an exemplary implementation of the present application.

In another implementation, the CN determines the UE's new RAN notification list and delivers it to the anchor gNB, the anchor gNB and the assistant gNB can filter and/or revise the UE's RAN notification list, as illustrated in FIG. 8. FIG. 8 is a diagram illustrating a UE initiated RNA update procedure for an RRC_INACTIVE UE moving within or out of the RNA in which the anchor gNB is situated, where the RAN notification list is determined by the CN and the anchor gNB and/or the assistant gNB, with the anchor gNB forwarding the RAN notification list to the assistant gNB, according to an exemplary implementation of the present application. Diagram 800 includes a UE 802, an anchor gNB 804, an assistant gNB 806, and a CN 830. In the present implementation, the UE 802, anchor gNB 804, assistant gNB 806, and CN 830 in FIG. 8 may substantially correspond to the UE 102, anchor gNB 104, assistant gNB 106, and CN 130, respectively, in FIG. 1A. In another implementation, the UE 802 may move from the anchor gNB 804 to the assistant gNB 806, where the anchor gNB 804 and the assistant gNB 806 are in the same RNA. In such case, the UE 802 may initiate an RNA update procedure periodically, for example, when a timer expires.

Diagram 800 shows actions 860, 862, 864, 866, 868, 870, 872, 874 and 876 for a UE initiated RNA update procedure as the RRC_INACTIVE UE 802 is moving within or out of the RNA in which the anchor gNB 804 is situated. In the present implementation, the actions 860, 862, 864, 866, and 868 may be substantially similar to the actions 560, 562, 564, 566, and 568, respectively, as shown in FIG. 5. Different from FIG. 5, in action 870, after the CN 830 determines the UE 802's new RAN notification list and sends the new RAN notification list to the anchor gNB 804, the anchor gNB 804 filters and/or revises the new RAN notification list based on its connection capability to other gNBs. For example, the anchor gNB 804 filters and/or removes the gNBs on the new RAN notification list that is on its blacklist, as indicated in action 870. In action 872, the anchor gNB 804 sends the RAN notification list with the filtered and/or revised gNB cell IDs (RAN area IDs or tracking area IDs) to the assistant gNB 806. In action 874, the assistant gNB 806 further filters and/or revises the already filtered/revised RAN notification list from the anchor gNB 804 based on the assistant gNB 806's connection capability to other gNBs. For example, in action 874, the assistant gNB 806 may filter and/or remove the gNB cell IDs (RAN area IDs or tracking area IDs) on the already filtered/revised RAN notification list that is on its blacklist. In action 876, the assistant gNB 806 sends the RAN notification list with the further filtered and/or revised gNB cell IDs (RAN area IDs or tracking area IDs) to the UE 802.

In one implementation, the size of RAN notification list implies the RAN notification area coverage. In one implementation, that RAN notification list may also comprise numerous beams, which have the cell IDs in the RAN notification list. As such, any beam in the RAN notification list may serve as an anchor gNB/assistant gNB/target gNB. In one implementation, the RAN notification list implies the RAN area IDs, which form the UE's RAN notification area coverage. In one implementation, each RAN area ID may be a cell ID, a list of cell IDs, or any form of RAN-based ID (e.g., a RAN area ID, a list of RAN area IDs, a tracking/notification area ID, or a list of tracking/notification area IDs). For example, a RAN area ID may represent a RAN area, which may be a subset of a CN tracking/notification area.

Figure 9:
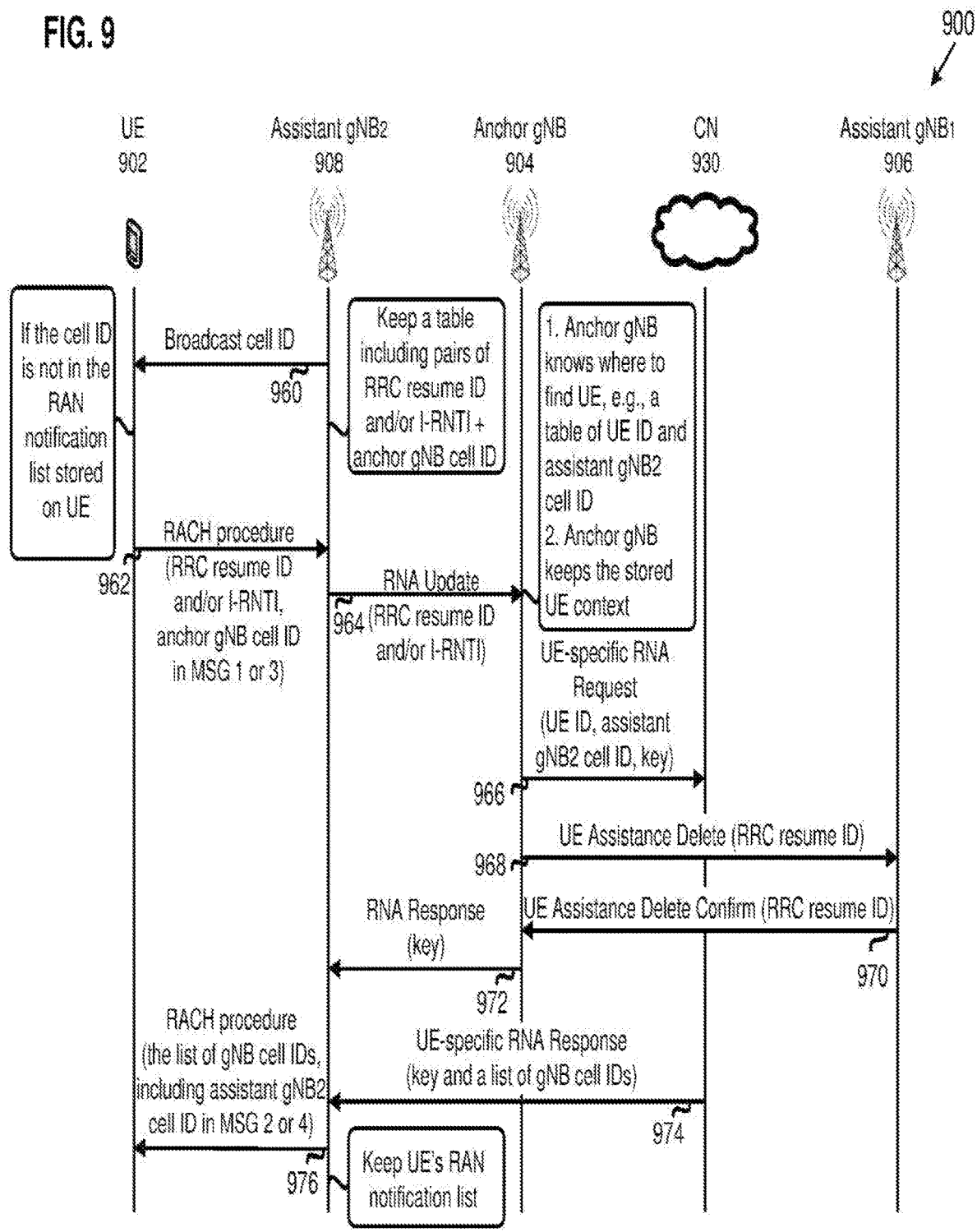
FIG. 9 is a diagram illustrating a UE initiated RNA update procedure for an RRC_INACTIVE UE moving within or out of an RNA in which the anchor gNB is not situated, according to an exemplary implementation of the present application.

Case 1-B: RRC_INACTIVE UE Moving within or Out of an RNA in which Anchor gNB is not Situated FIG. 9 is a diagram illustrating a UE initiated RNA update procedure for an RRC_INACTIVE UE moving within or out of an RNA in which the anchor gNB is not situated, according to an exemplary implementation of the present application. Diagram 900 includes a UE 902, an anchor gNB 904, an assistant gNB$_1$ 906, an assistant gNB$_2$ 908, and a CN 930. In the present implementation, the UE 902, anchor gNB 904, assistant gNB$_1$ 906, assistant gNB$_2$ 908, and CN 930 in FIG. 9 may substantially correspond to the UE 102, anchor gNB 104, assistant gNB$_1$ 106, assistant gNB$_2$ 108 and CN 130, respectively, in FIG. 1B. In another implementation, the UE 902 may move from the assistant gNB$_1$ 906 to the assistant gNB$_2$ 908, where the assistant gNB$_1$ 906 to the assistant gNB$_2$ 908 are in the same RNA. In such case, the UE 902 may initiate an RNA update procedure periodically, for example, when a timer expires.

Diagram 900 also shows actions 960, 962, 964, 966, 968, 970, 972, 974 and 976 for a UE initiated RNA update procedure as the RRC_INACTIVE UE 902 moves within or out of the RNA in which the assistant gNB$_1$ 906 is situated. Initially, the RRC_INACTIVE UE 902 may keep receiving the broadcast cell IDs (RAN area IDs or tracking area IDs) and may camp on any gNB with the received broadcast cell IDs (RAN area IDs or tracking area IDs). For example, in action 960, the RRC_INACTIVE UE 902 receives the cell ID (RAN area ID or tracking area ID) of the assistant gNB$_2$ 908 broadcast from the assistant gNB$_2$ 908. When the RRC_INACTIVE UE 902 compares the cell ID (RAN area ID or tracking area ID) of the assistant gNB$_2$ 908 with the cell IDs (RAN area IDs or tracking area IDs) stored in its RAN notification list, the RRC_INACTIVE UE 902 determines that it is moving or has moved out of the RNA in which the assistant gNB$_1$ 906 is situated. As a result, the RRC_INACTIVE UE 902 initiates an RNA update, to remove the information of the RRC_INACTIVE UE 902 stored on the first assistant gNB (e.g., the assistant gNB$_1$ 906) by using a UE Assistance Delete message from the anchor gNB, (e.g., the anchor gNB 904), and to update the RAN notification list. In action 962, after determining that the received broadcast cell ID (RAN area ID or tracking area ID) from the assistant gNB$_2$ 908 is not in its RAN notification list, the RRC_INACTIVE UE 902 initiates a RACH procedure with the assistant gNB$_2$ 908. The RACH procedure can be the 2-step RACH or the 4-step RACH described with reference to FIGS. 3A and 3B, respectively. The RRC_INACTIVE UE 902 may send its RRC resume ID and/or I-RNTI and the anchor gNB cell ID (RAN area ID or tracking area ID) in either MSG 1 in FIG. 3A or MSG 3 in FIG. 3B. The assistant gNB$_2$ 908 may keep a table including a list of RRC resume IDs and/or I-RNTIs and anchor gNB cell IDs (RAN area IDs or tracking area IDs) in matching pairs, as the assistant gNB$_2$ 908 may be an assistant gNB for multiple RRC_INACTIVE UEs. In action 964, upon receiving the RRC resume ID and/or I-RNTI from the RRC_INACTIVE UE 902, which is new to the assistant gNB$_2$ 908, the assistant gNB$_2$ 908 sends an RNA Update message to the anchor gNB 904, where the RNA Update message includes the received RRC resume ID and/or I-RNTI from the UE 902. The anchor gNB 904 receives the RNA Update message from the assistant gNB$_2$ 908 and updates the table of UE ID and the assistant gNB$_2$ 908's cell ID (RAN area ID or tracking area ID), so that the anchor gNB 904 knows where the RRC_INACTIVE UE 902 is located. The anchor gNB 904 still keeps the stored UE context.

In action 966, the anchor gNB 904 sends a UE-specific RNA Request to the CN 930 (e.g., 5GC), where the UE-specific RNA Request includes the RRC_INACTIVE UE 902's UE ID, the assistant gNB$_2$ 908's cell ID (RAN area ID or tracking area ID), and a key. The format and functionality of the key may be substantially similar to the key described with reference to FIG. 4. In action 968, the anchor gNB 904 sends a UE Assistance Delete message having the RRC resume ID and/or I-RNTI to the assistant gNB$_1$ 906. As a result, the assistant gNB$_1$ 906 deletes the information of the RRC_INACTIVE UE 902. That is, the RRC_INACTIVE UE 902 is to have only one assistant gNB at a time. In action 970, after deleting the information of the RRC_INACTIVE UE 902, the assistant gNB$_1$ 906 replies a UE Assistance Delete Confirm message to the anchor gNB 904. As such, the information of the RRC_INACTIVE UE 902 stored on the assistant gNB$_1$ 906 is removed by using the UE Assistance Delete message from the anchor gNB 904.

In action 972, the anchor gNB 904 sends an RNA Response including the key to the assistant gNB$_2$ 908. Based on the received UE ID from action 966, the CN 930 checks the UE context and determines a new RNA for the RRC_INACTIVE UE 902. In action 974, the CN 930 sends a UE-specific RNA Response, including the key and the new RNA having a list of gNB cell IDs (a list of gNB RAN area IDs or a list of gNB tracking area IDs), to the assistant gNB$_2$ 908. The present implementation also utilizes key mapping between the assistant gNB$_2$ 908 and the CN 930 to ensure the integrity of the CN 930, and to confirm that the received UE-specific RNA Response from the CN 930 and the RNA Response from the anchor gNB 904 correspond to the UE 902. In action 976, the assistant gNB$_2$ 908 then transmits the new RNA, which include the list of gNB cell IDs (e.g., with the assistant gNB$_2$'s cell ID) (the list of gNB RAN area IDs (e.g., with the assistant gNB$_2$ 908's RAN area ID), or the list of gNB tracking area IDs (e.g., with the assistant gNB$_2$ 908's tracking area ID)), to the RRC_INACTIVE UE 902, using MSG 2 in FIG. 3A or MSG 4 in FIG. 3B. As such, the RAN notification list is updated.

Figure 10:
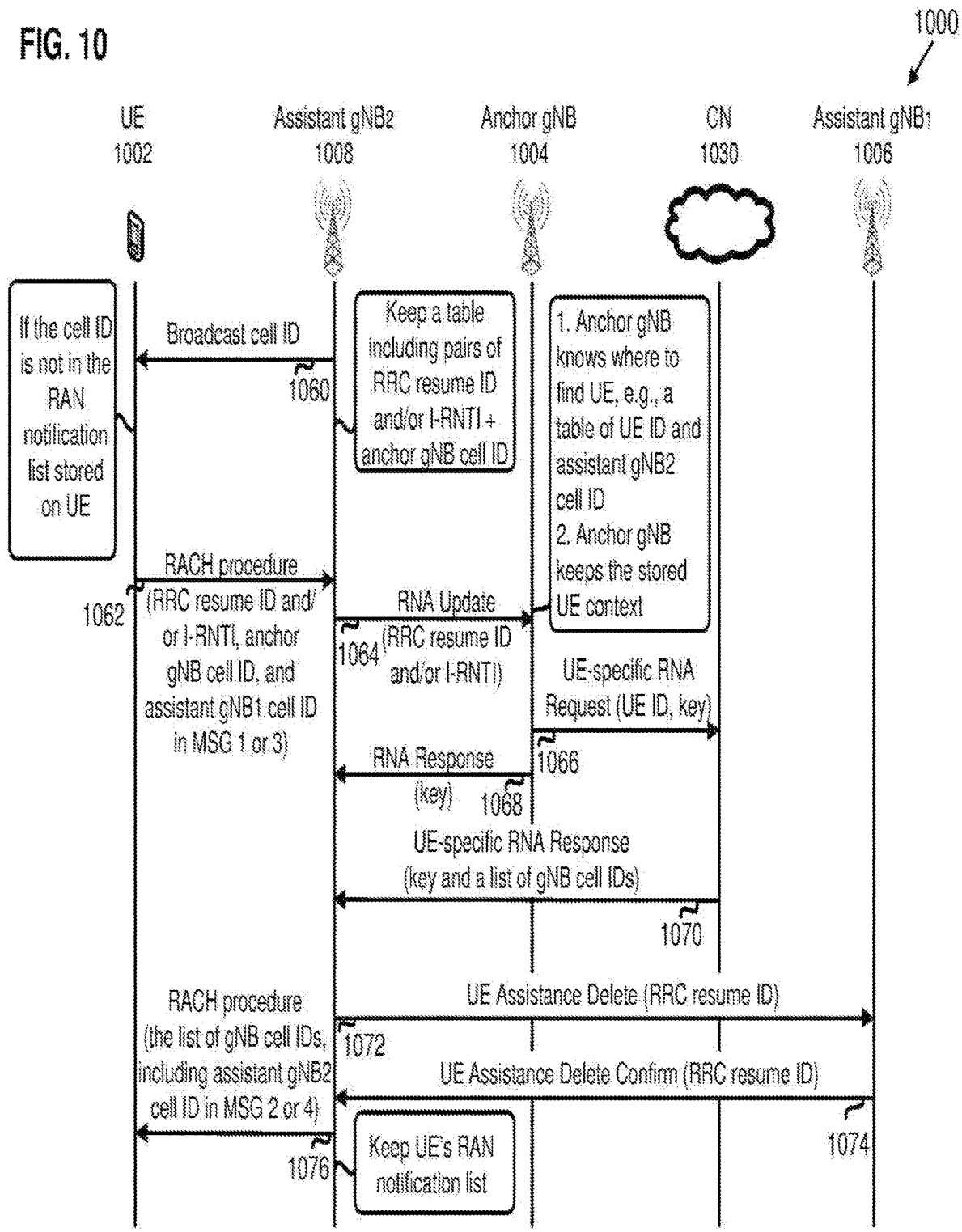
FIG. 10 is a diagram illustrating a UE initiated RNA update procedure for an RRC_INACTIVE UE moving within or out of the RNA in which the anchor gNB is not situated, according to another exemplary implementation of the present application.

FIG. 10 is a diagram illustrating a UE initiated RNA update procedure for an RRC_INACTIVE UE moving within or out of the RNA in which the anchor gNB is not situated, according to another exemplary implementation of the present application. Diagram 1000 includes a UE 1002, an anchor gNB 1004, an assistant gNB$_1$ 1006, an assistant gNB$_2$ 1008, and a CN 1030. In the present implementation, the UE 1002, anchor gNB 1004, assistant gNB$_1$ 1006, assistant gNB$_2$ 1008, and CN 1030 in FIG. 10 may substantially correspond to the UE 102, anchor gNB 104, assistant gNB₁ 106, assistant gNB₂ 108 and CN 130, respectively, in FIG. 1B. In another implementation, the UE 1002 may move from the assistant gNB₁ 1006 to the assistant gNB₂ 1008, where the assistant gNB₁ 1006 to the assistant gNB₂ 1008 are in the same RNA. In such case, the UE 1002 may initiate an RNA update procedure periodically, for example, when a timer expires.

Diagram 1000 also shows actions 1060, 1062, 1064, 1066, 1068, 1070, 1072, 1074, and 1076 for a UE initiated RNA update procedure as the RRC_INACTIVE UE 1002 moves within or out of the RNA in which the assistant gNB₁ 1006 is situated. In contrast to FIG. 9, the information of the RRC_INACTIVE UE 1002 stored on the first assistant gNB (e.g., the assistant gNB₁ 1006) is removed by using a UE Assistance Delete message from the second assistant gNB (e.g., the assistant gNB₂ 1008). In action 1062, the UE 1002 sends RRC resume ID and/or I-RNTI, anchor gNB 1004's cell ID (RAN area ID or tracking area ID) and the assistant gNB₁ 1006's cell ID (RAN area ID or tracking area ID) to the assistant gNB₂ 1008, for example, in either MSG 1 in FIG. 3A or MSG 3 in FIG. 3B. As a result, in action 1072, the assistant gNB₂ 1008 can send a UE Assistance Delete message to the assistant gNB₁ 1006 directly. That is, the RRC_INACTIVE UE 1002 is to have only one assistant gNB at a time. In action 1074, after deleting the information of the RRC_INACTIVE UE 1002, the assistant gNB₁ 1006 replies a UE Assistance Delete Confirm message to the assistant gNB₂ 1008. As such, the information of the RRC_I-NACTIVE UE 1002 stored on the assistant gNB₁ 1006 is removed by using the UE Assistance Delete message from the assistant gNB₂ 1008.

Similar to FIG. 9, the RRC_INACTIVE UE initiated RNA update procedure also updates the RAN notification list. As shown in FIG. 10, the present implementation also utilizes key mapping between the assistant gNB₂ 1008 and the CN 1030 to ensure the integrity of the CN 1030, and to confirm that the received UE-specific RNA Response from the CN 1030 and the RNA Response from the anchor gNB 1004 correspond to the UE 1002.

As discussed above, the implementations of the present application under Case 1-A have three approaches for RAN notification list determination, namely, by a CN, by one or more gNBs, and by a CN and one or more gNBs; and two approaches for RAN notification list delivery, namely, the CN delivering to the assistant gNB through key mapping, and the anchor gNB forwarding the RAN notification list. It should be understood that the abovementioned approaches for RAN notification list determination and for RAN notification list delivery may also be applied for Case 1-B.

Figure 11:
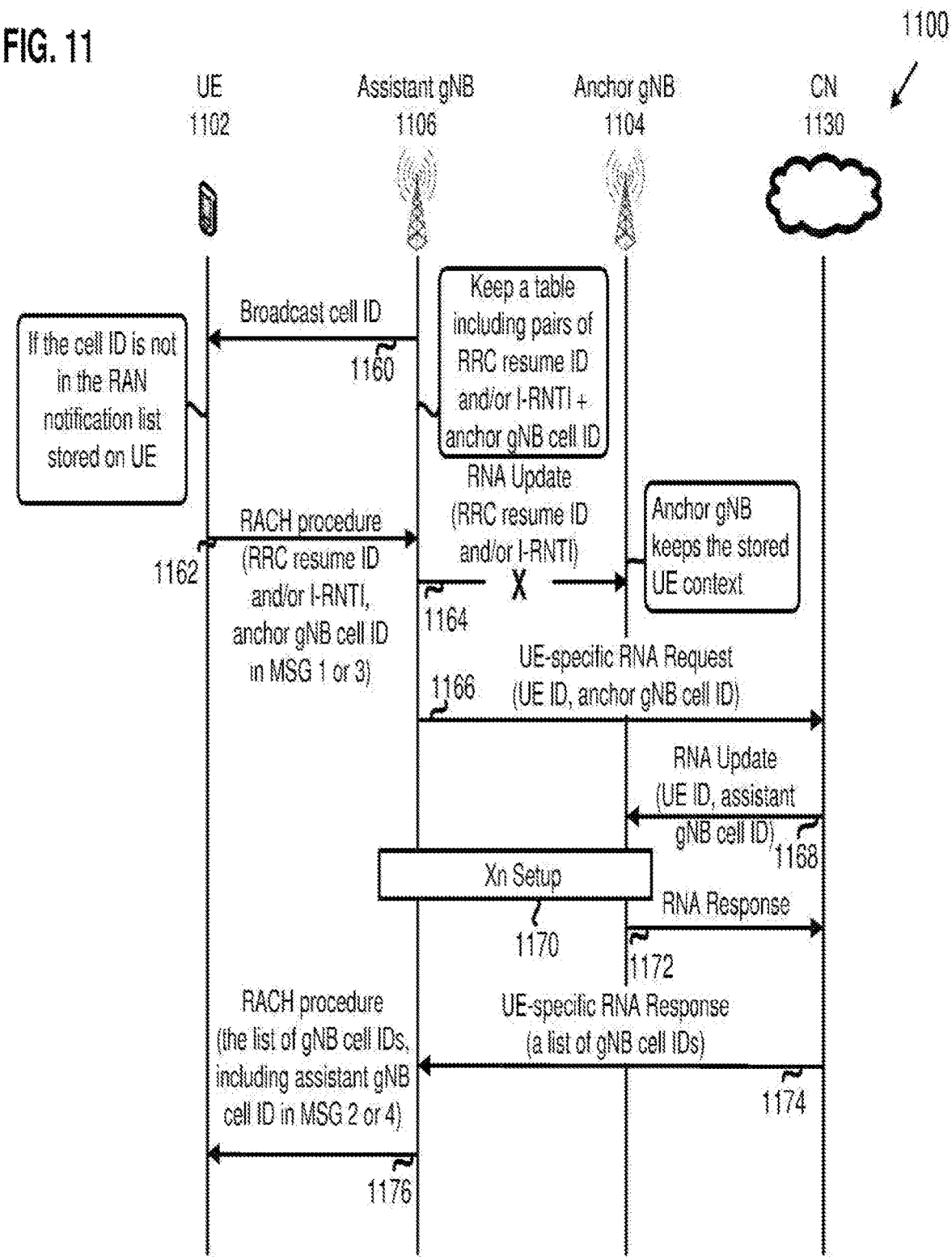
FIG. 11 is a diagram illustrating a UE initiated RNA update procedure for an RRC_INACTIVE UE moving within or out of the RNA in which the anchor gNB is situated, where the assistant gNB cannot find and/or connect to the anchor gNB directly, according to an exemplary implementation of the present application.

FIG. 11 is a diagram illustrating a UE initiated RNA update procedure for an RRC_INACTIVE UE moving within or out of the RNA in which the anchor gNB is situated, where the assistant gNB cannot find and/or connect to the anchor gNB directly, according to an exemplary implementation of the present application. Diagram 1100 includes a UE 1102, an anchor gNB 1104, an assistant gNB 1106, and a CN 1130. In the present implementation, the UE 1102, anchor gNB 1104, assistant gNB 1106, and CN 1130 in FIG. 11 may substantially correspond to the UE 102, anchor gNB 104, assistant gNB 106, and CN 130 in FIG. 1A, respectively. In another implementation, the UE 1102 may move from the anchor gNB 1104 to the assistant gNB 1106, where the anchor gNB 1104 and the assistant gNB 1106 are in the same RNA. In such case, the UE 1102 may initiate an RNA update procedure periodically, for example, when a timer expires.

Diagram 1100 also shows actions 1160, 1162, 1164, 1166, 1168, 1170, 1172, 1174, and 1176 for a UE initiated RNA update procedure as the RRC_INACTIVE UE 1102 moves within or out of the RNA in which the anchor gNB 1104 is situated. As shown in FIG. 11, in action 1164, the assistant gNB 1106 cannot find and/or connect to the anchor gNB 1104 directly. For example, the assistant gNB 1106 has no direct connection to the anchor gNB 1104. Or, the assistant gNB 1106 is on the blacklist of the anchor gNB 1104. In such circumstances, the assistant gNB 1106 may find and connect to the anchor gNB 1104 through the CN 1130.

As shown in FIG. 11, in action 1166, the assistant gNB 1106 sends a UE-specific RNA Request to the CN 1130 (e.g., 5G CN), where the UE-specific RNA Request includes the RRC_INACTIVE UE 1102's UE ID and the anchor gNB 1104's cell ID (RAN area ID or tracking area ID). After the CN 1130 finds the anchor gNB 1104 through the anchor gNB 1104's cell ID (RAN area ID or tracking area ID) in the UE-specific RNA Request, the CN 1130 notifies the anchor gNB 1104 by sending an RNA Update message to the anchor gNB 1104 in action 1168. Thereafter, in action 1170, an Xn Setup may be performed between the assistant gNB 1106 and anchor gNB 1104. The Xn Setup may include the interaction between the assistant gNB 1106 and the anchor gNB 1104, for example, to establish an Xn interface. For example, the Xn Setup may include XN SETUP REQEUST message, XN SETUP RESPONSE message and/or XN SETUP FAILURE message.

In the present implementation, the CN determines the RAN notification list. It should be noted that the three approaches for RAN notification list determination and two approaches for RAN notification list delivery can also be applied, when the assistant gNB cannot find or connected to the anchor gNB directly. Also, it should be understood that similar methods may apply for Case 1-B, when the assistant gNB cannot find or connected to the anchor gNB directly.

In the present implementation, the CN finds the anchor gNB, then the anchor gNB may build a connection to the assistant gNB. In another implementation, the information transfer between the anchor gNB and the assistant gNB may bypass the CN. In yet another implementation, the anchor gNB may even release UE context, and the CN may deliver the UE context to the assistant gNB. In this way, the assistant gNB becomes the anchor gNB.

In yet another implementation, RRC_INACTIVE UE may make RRC state transition from RRC_INACTIVE state to RRC_IDLE state, and perform cell selection to camp on the gNB. Afterwards, an RRC connection establishment may be proceeded, such that the UE enters RRC_CONNECTED state. Meanwhile, the CN may notify the original anchor gNB to remove the UE context.

Case 2

DL Data to RRC_INACTIVE UE Via Assistant gNB

Case 2-A: DL Data to RRC_INACTIVE UE Via Anchor gNB—Anchor gNB Initiation

Figure 12:
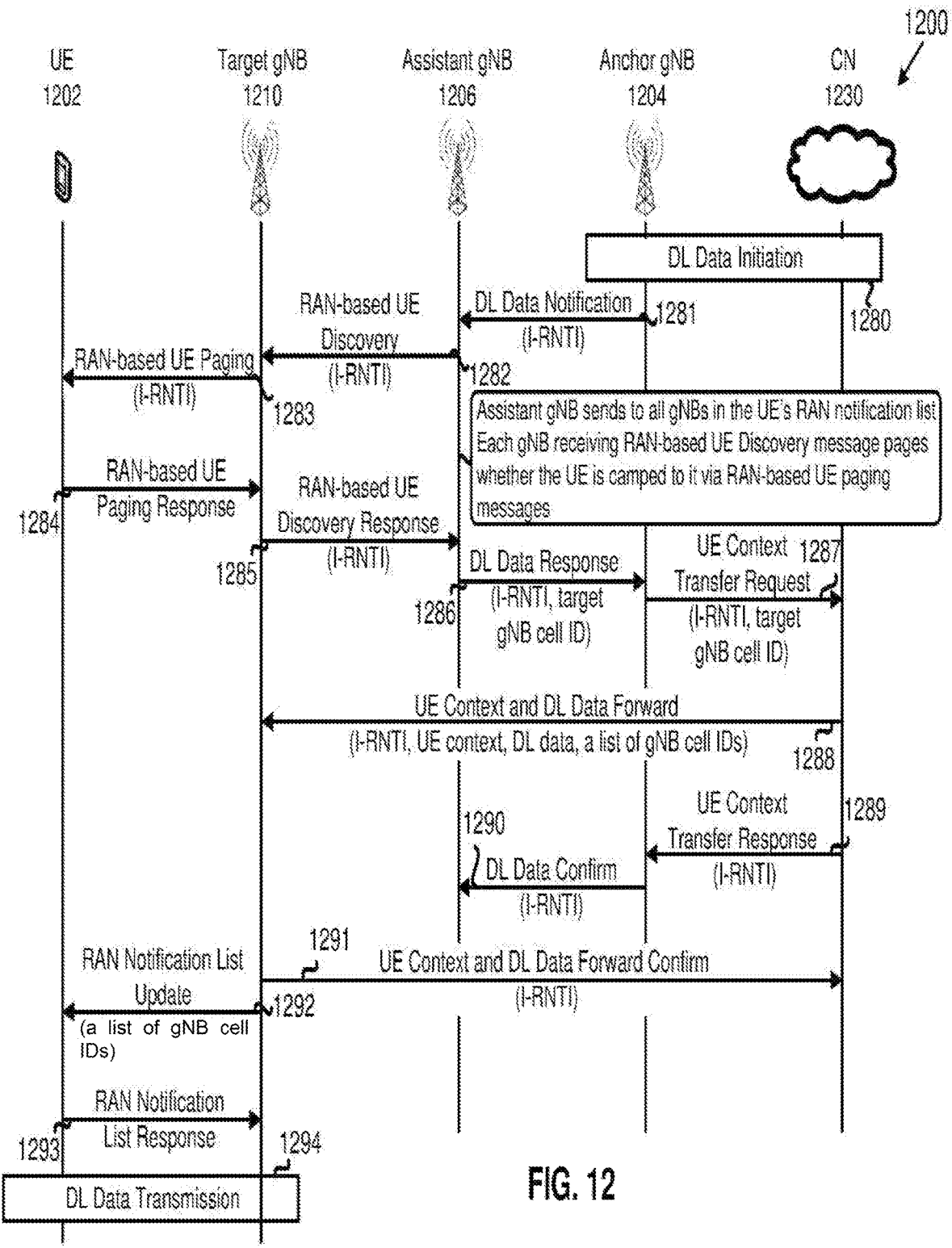
FIG. 12 is a diagram illustrating DL data notification via the anchor gNB, according to an exemplary implementation of the present application.

FIG. 12 is a diagram illustrating DL data notification via the anchor gNB, according to an exemplary implementation of the present application. Diagram 1200 includes a UE 1202, an anchor gNB 1204, an assistant gNB 1206, a target gNB 1210, and a CN 1230. In the present implementation, the UE 1202, anchor gNB 1204, assistant gNB 1206, target gNB 1210, and CN 1230 in FIG. 12 may substantially correspond to the UE 102, anchor gNB 104, assistant gNB 106, target gNB 110, and CN 130, respectively, in FIG. 1A.

Diagram 1200 also shows actions 1280, 1281, 1282, 1283, 1284, 1285, 1286, 1287, 1288, 1289, 1290, 1291, 1292, 1293, and 1294, for DL data notification via the anchor gNB as the RRC_INACTIVE UE 1202 moves to the gNB coverage area of the target gNB 1210 and the CN 1230 has DL data for the RRC_INACTIVE UE 1202.

As shown in FIG. 12, in action 1280, when the CN 1230 has DL data for the RRC_INACTIVE UE 1202, the CN 1230 finds the anchor gNB 1204 via the UE 1202's UE context. In one implementation, when the anchor gNB 1204, as the last serving gNB, receives DL data from the UPF or DL signaling from the AMF of the CN 1230, the anchor gNB 1204 may page in the cells corresponding to the RNA. The anchor gNB 1204 may send RAN paging (e.g., using an Xn interface) to neighboring gNB(s) if the RNA includes cells of neighboring gNB(s) (e.g., assistance gNB and/or target gNB). The anchor gNB 1204 searches its table to find the assistant gNB 1206 of the RRC_INACTIVE UE 1202. In action 1281, the anchor gNB 1204 sends a DL Data Notification, which carries the RRC resume ID and/or I-RNTI of the RRC_INACTIVE UE 1202, to the assistant gNB 1206.

Upon receiving the DL Data Notification, the assistant gNB 1206 begins to send RAN-based UE Discovery messages carrying the RRC resume ID and/or I-RNTI to all gNBs in the UE 1202's RAN notification list. The RAN notification list may be the new or updated RAN notification list as described with reference to Case 1-A and/or Case 1-B. Each gNB receiving the RAN-based UE Discovery sends a RAN-based UE Paging message, which carries the RRC resume ID and/or I-RNTI, to find the RRC_INACTIVE UE 1202. As shown in FIG. 12, in action 1282, the assistant gNB 1206 sends a RAN-based UE Discovery message carrying the RRC resume ID and/or I-RNTI to the target gNB 1210 in the UE 1202's RAN notification list. In action 1283, the target gNB 1210 send a RAN-based UE Paging message, which carries the RRC resume ID and/or I-RNTI, to the RRC_INACTIVE UE 1202. Once the RRC_INACTIVE UE 1202 receives the RAN-based UE Paging message, it identifies the target gNB 1210, which it receives the RAN-based UE Paging message from, as its target gNB, and replies with a RAN-based UE Paging Response in action 1284. Only the gNB (i.e., the target gNB 1210) receiving the RAN-based UE Paging Response may reply to the assistant gNB 1206 with a RAN-based UE Discovery Response message carrying the RRC resume ID and/or I-RNTI, as shown in action 1285.

The assistant gNB 1206, in action 1286, notifies the anchor gNB 1204 with a DL Data Response carrying the RRC resume ID and/or I-RNTI and target gNB cell ID (RAN area ID or tracking area ID). After knowing which RAN the RRC_INACTIVE UE 1202 is in, the anchor gNB 1204 transfers the UE context and DL data to the target gNB 1210. In action 1287, the anchor gNB 1204 sends a UE Context Transfer Request carrying the RRC resume ID and/or I-RNTI and target gNB 1210's cell ID (RAN area ID or tracking area ID) to the CN 1230. In action 1288, the CN 1230 sends the UE Context and DL Data Forward carrying the RRC resume ID and/or I-RNTI, UE context, DL data, and the UE 1202's RAN notification list (e.g., having a list of gNB cell IDs (RAN area IDs or tracking area IDs)) to the target gNB 1210. In action 1289, the CN 1230 also sends a UE Context Transfer Response carrying the RRC resume ID and/or I-RNTI to the anchor gNB 1204. In action 1290, the anchor gNB 1204 sends a DL Data Confirm message carrying the RRC resume ID and/or I-RNTI to the assistant gNB 1206, and deletes any information regarding to the RRC_INACTIVE UE 1202, such as UE context and the pair of UE ID and assistant gNB. Upon receiving the DL Data Confirm message, the assistant gNB 1206 deletes the UE ID and its RAN notification list. Once the target gNB 1210 receives the UE context and DL Data Forward from the CN 1230, its stores the UE context and the RRC_INACTIVE UE 1202's RAN notification list. In action 1291, the target gNB 1210 replies to the CN 1230 with a UE Context and DL Data Forward Confirm message carrying the RRC resume ID and/or I-RNTI. Thus, the connection between the target gNB 1210 and CN 1230 is established, and the connection between the anchor gNB 1204 and CN 1230 (e.g., S1-MME, N2) is released. In action 1292, the target gNB 1210 also updates the latest RAN notification list to the RRC_INACTIVE UE 1202 through a RAN Notification List Update. In action 1293, the RRC_INACTIVE UE 1202 confirms the received updated RAN notification list through a RAN Notification List Response. Thereafter, the target gNB 1210 starts to receive DL data traffic from the CN 1230, and sends the DL data to the UE 1202 in action 1294. It's noted that in action 1283, action 1292 or action 1294, the UE 1202 may stay in RRC_INACTIVE state, or be indicated by the target gNB 1210 to transition to RRC_CONNECTED state, for DL data transmission and reception.

Case 2-B: DL Data to RRC_INACTIVE UE Directly Via Assistant gNB—CN Initiation

Figure 13:
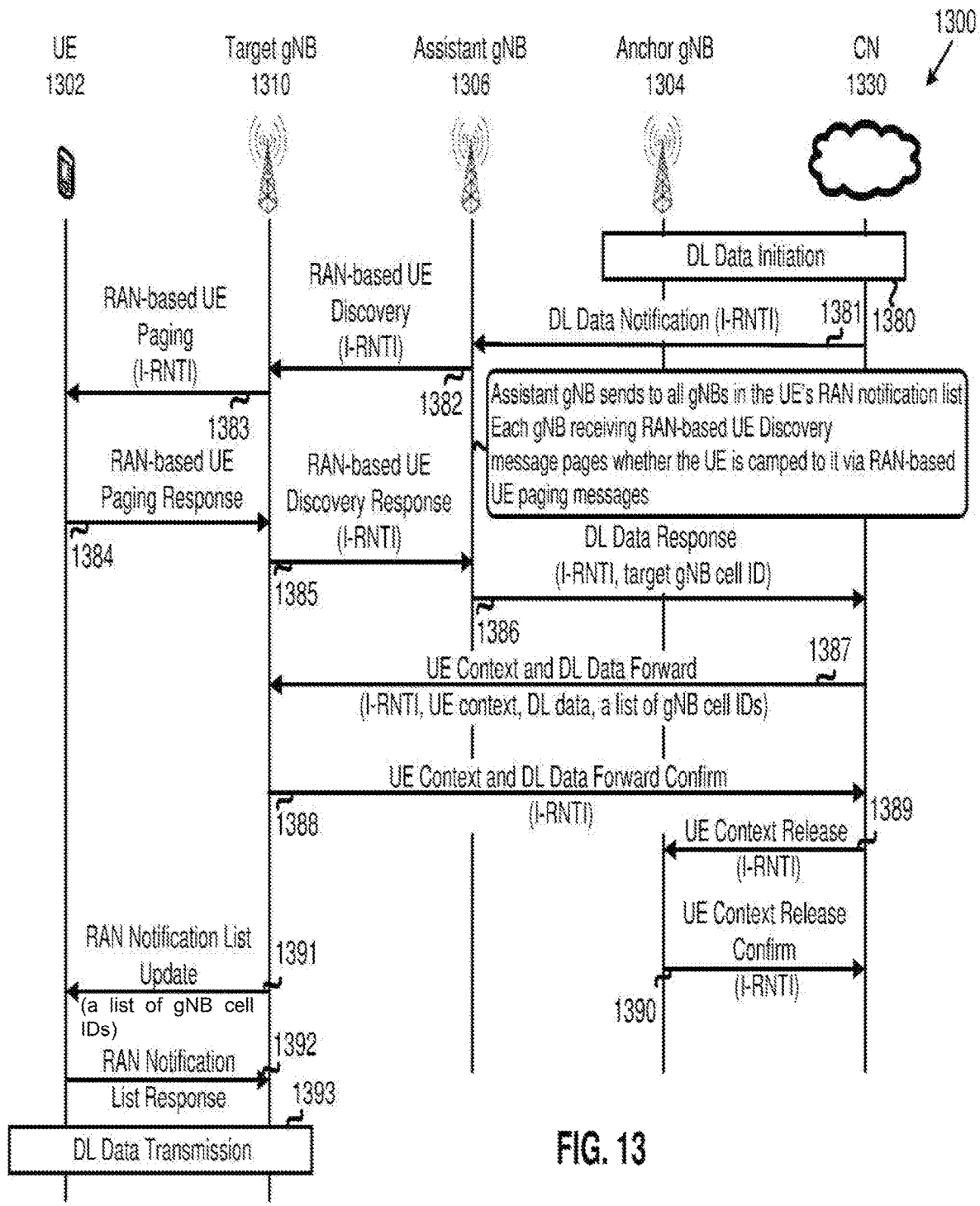
FIG. 13 is a diagram illustrating DL data notification directly to the assistant gNB, according to an exemplary implementation of the present application.

FIG. 13 is a diagram illustrating DL data notification directly to the assistant gNB, according to an exemplary implementation of the present application. Diagram 1300 includes a UE 1302, an anchor gNB 1304, an assistant gNB 1306, a target gNB 1310, and a CN 1330. In the present implementation, the UE 1302, anchor gNB 1304, assistant gNB 1306, target gNB 1310, and CN 1330 in FIG. 13 may substantially correspond to the UE 102, anchor gNB 104, assistant gNB 106, target gNB 110, and CN 130, respectively, in FIG. 1A.

Diagram 1300 also shows actions 1380, 1381, 1382, 1383, 1384, 1385, 1386, 1387, 1388, 1389, 1390, 1391, 1392, and 1393, for DL data notification directly to the assistant gNB 1306 as the RRC_INACTIVE UE 1302 moves to the gNB coverage area of the target gNB 1310 and the CN 1330 has DL data for the RRC_INACTIVE UE 1302. Different from diagram 1200 in FIG. 12, in diagram 1300, the CN 1330 knows the assistant gNB 1306 of the UE 1302, it can directly send a DL Data Notification to the assistant gNB 1306 without routing through the anchor gNB 1304, as shown in action 1381. Upon receiving RAN-based UE Discovery Response from the target gNB 1310 as indicated in action 1385, the assistant gNB 1306 directly sends a DL Data Response to the CN 1330 in action 1386. It should be noted that, in the present implementation, the CN 1330 informs the anchor gNB 1304 to release the UE context at a later stage, for example, in action 1389. It is noted that in action 1383, action 1391 or action 1293, the UE 1302 may stay in RRC_INACTIVE state, or be indicated by the target gNB 1310 to transition to RRC_CONNECTED state, for DL data transmission and reception.

It should be understood that Cases 2-A and 2-B of DL Data to RRC_INACTIVE UE via Assistant gNB may be applied not only to Case 1-A as descried above, but also to Case 1-B.

Case 3

UL Data From RRC_INACTIVE UE—Direct Approach

Figure 14:
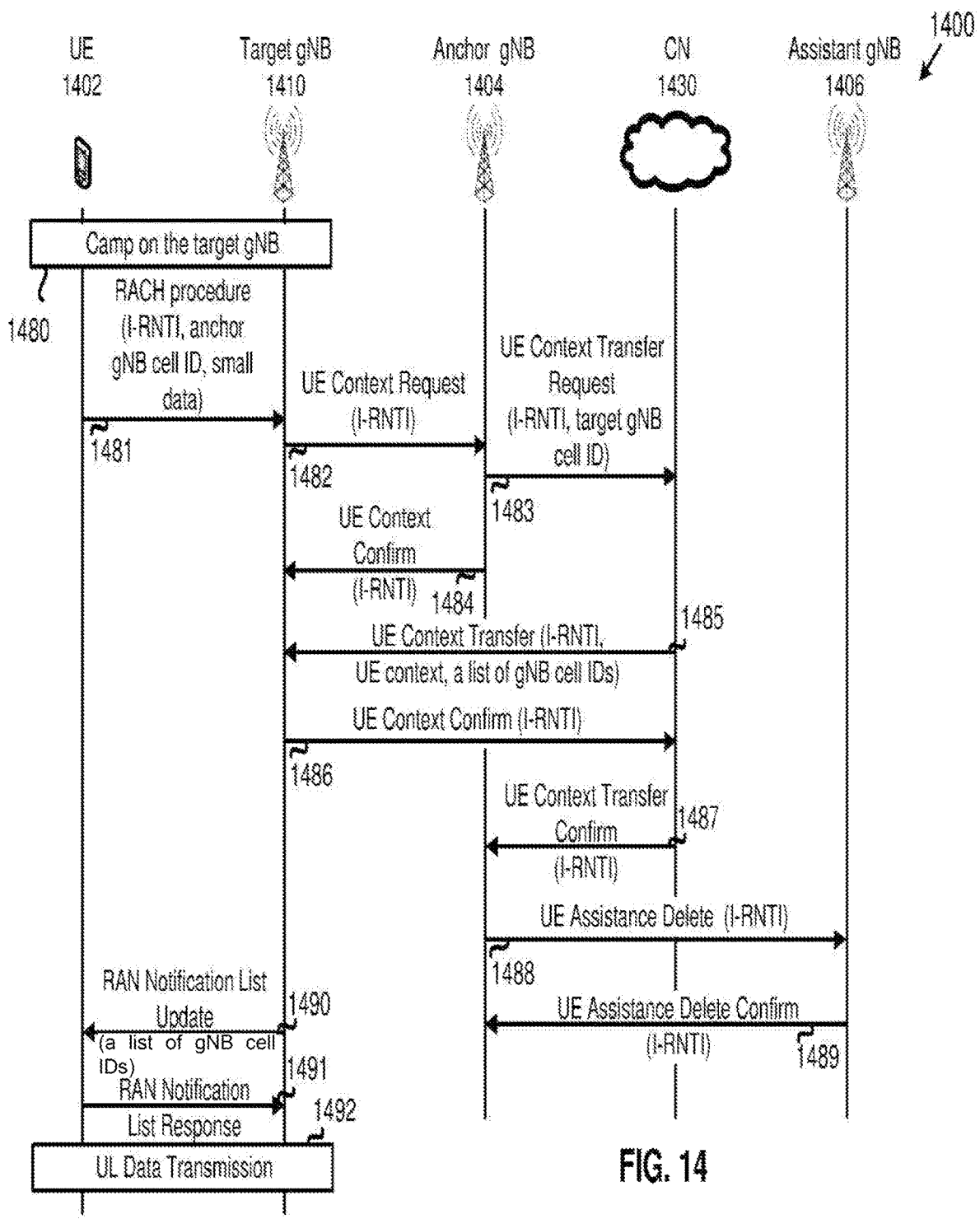
FIG. 14 is a diagram illustrating UL data from the RRC_INACTIVE UE to the target gNB, which includes assistant gNB update and UE context transfer, according to an exemplary implementation of the present application.

FIG. 14 is a diagram illustrating UL data from the RRC_INACTIVE UE to the target gNB, which includes assistant gNB update and UE context transfer, according to an exemplary implementation of the present application. Diagram 1400 includes a UE 1402, an anchor gNB 1404, an assistant gNB 1406, a target gNB 1410, and a CN 1430. In the present implementation, the UE 1402, anchor gNB 1404, assistant gNB 1406, target gNB 1410, and CN 1430 in FIG. 14 may substantially correspond to the UE 102, anchor gNB 104, assistant gNB 106, target gNB 110, and CN 130, respectively, in FIG. 1A.

Diagram 1400 also shows actions 1480, 1481, 1482, 1483, 1484, 1485, 1486, 1487, 1488, 1489, 1490, 1491, and 1492, for UL data from the RRC_INACTIVE UE to the target gNB, as the RRC_INACTIVE UE 1402 moves to the gNB coverage area of the target gNB 1410 and has UL data for the target gNB 1410. In the present implementation, when the RRC_INACTIVE UE moves into the coverage area of a target gNB, it is assumed that the RRC_INACTIVE UE does cell (re)selection and camps on the target gNB. As shown in FIG. 14, in action 1480, the RRC_INACTIVE UE 1402 moves into the coverage area of the target gNB 1410, and camps on the target gNB 1410. When the RRC_INACTIVE UE 1402 needs to access (e.g., send uplink data) a gNB (e.g., the target gNB 1410) that is not the last serving gNB (e.g., the anchor gNB 1404), in action 1481, the RRC_INACTIVE UE 1402 starts a RACH procedure with the target gNB 1410, which can be a 2-step or 4-step RACH procedure. The RRC_INACTIVE UE 1402 sends the RRC resume ID and/or I-RNTI and anchor gNB 1404's cell ID (RAN area ID or tracking area ID) either in MSG1 of the 2-step RACH procedure shown in FIG. 3A, or in MSG1/MSG 3 of the 4-step RACH procedure shown in FIG. 3B. The small data can be transmitted either in MSG1 of the 2-step RACH procedure shown in FIG. 3A, or in MSG1/MSG 3 of the 4-step RACH procedure shown in FIG. 3B, or in dedicated uplink resources after RRC connection establishment or resume procedure such as PUSCH. In action 1482, the target gNB 1410 triggers a procedure (e.g., an XnAP Retrieve UE context procedure) to retrieve the UE context from the anchor gNB 1404. For example, the target gNB 1410 sends a UE Context Request carrying the RRC resume ID and/or I-RNTI to the anchor gNB 1404. In action 1483, the anchor gNB 1404 sends a UE Context Transfer Request carrying the RRC resume ID and/or I-RNTI and the target gNB's cell ID (RAN area ID or tracking area ID) to the CN 1430. In action 1484, the anchor gNB 1404 also sends a UE Context Confirm message carrying the RRC resume ID and/or I-RNTI to the target gNB 1410. Based on the UE context, in action 1485, the CN 1430 sends a UE Context Transfer message carrying the RRC resume ID and/or I-RNTI, UE context, and a list of gNB cell IDs (RAN area IDs or tracking area IDs) to the target gNB 1410. In action 1486, the target gNB 1410 stores the UE's RAN notification list and replies a UE Context Confirm message carrying the RRC resume ID and/or I-RNTI to the CN 1430.

In action 1487, the CN 1430 sends a UE Context Transfer Confirm message carrying the RRC resume ID and/or I-RNTI to the anchor gNB 1404. In action 1488, the anchor gNB 1404 sends a UE Assistance Delete message carrying the RRC resume ID and/or I-RNTI to the assistant gNB 1406. The assistant gNB 1406 then deletes the information of the UE 1402 and its RAN notification list, and then sends a UE Assistance Delete Confirm message to the anchor gNB 1404 in action 1489. Upon receiving the UE Assistance Delete Confirm message, the anchor gNB 1404 also deletes the UE context and the information of the UE 1402 and its assistant gNB 1406. Regarding to the target gNB 1410, which also becomes the anchor gNB and assistant gNB, in action 1490, the target gNB 1410 sends a RAN Notification List Update carrying a list of gNB cell IDs (RAN area IDs or tracking area IDs) to the RRC_INACTIVE UE 1402. In action 1491, the UE 1402 replies a RAN Notification List Response to the target gNB 1410. Since the target gNB 1410 has identified the UE 1402 via the UE context, and the connection between the target gNB 1410 and the CN 1430 has established, the target gNB 1410 can receive and forward UL data from the UE 1402 and forwards the UL date to the CN. The UL data transmission may begin either via RACH procedure or in dedicated UL resources. It is noted that in action 1490 or action 1492, the UE 1402 may stay in RRC_INACTIVE, or be indicated by the target gNB 1410 in RACH procedure. In one example, the UE 1402 may transition to RRC_CONNECTED state for UL data transmission and reception. In another example, the UE 1402 may transition to RRC_IDLE state. In some embodiments, the action 1490 and action 1491 may take place after uplink data transmission. For example, after the uplink data transmission and the UE 1402 transitions to RRC_INACTIVE state, the action 1490 and action 1491 are needed to configure the UE 1402 with the RAN notification list.

It should be understood that Case 3 for UL Data from the RRC_INACTIVE UE may be applied to not only to Case 1-A as descried above, but also to Case 1-B.

Figure 15:
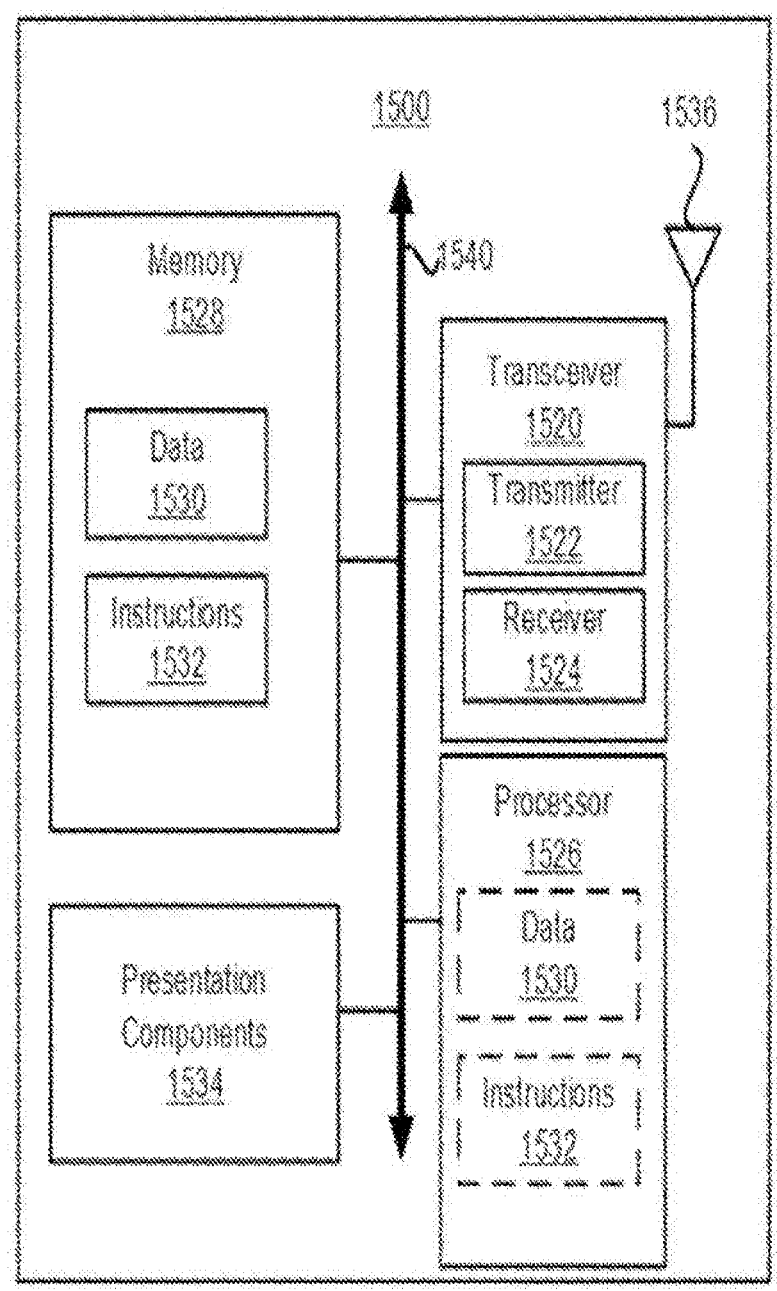
FIG. 15 illustrates a block diagram of a node for wireless communication, in accordance with various aspects of the present application.

FIG. 15 illustrates a block diagram of a node for wireless communication, in accordance with various aspects of the present application. As shown in FIG. 15, node 1500 may include transceiver 1520, processor 1526, memory 1528, one or more presentation components 1534, and at least one antenna 1536. Node 1500 may also include a Radio Frequency (RF) spectrum band module, a base station communications module, a network communications module, and a system communications management module, input/output (I/O) ports, I/O components, and power supply (not explicitly shown in FIG. 15). Each of these components may be in communication with each other, directly or indirectly, over one or more buses 1540.

Transceiver 1520 having transmitter 1522 and receiver 1524 may be configured to transmit and/or receive time and/or frequency resource partitioning information. In some implementations, transceiver 1520 may be configured to transmit in different types of subframes and slots including, but not limited to, usable, non-usable and flexibly usable subframes and slot formats. Transceiver 1520 may be configured to receive data and control channels.

Node 1500 may include a variety of computer-readable media. Computer-readable media can be any available media that can be accessed by node 1500 and include both volatile (and/or non-volatile) media and removable (and/or non-removable) media. By way of example, and not limitation, computer-readable media may comprise computer storage media and communication media. Computer storage media includes both volatile (and/or non-volatile) and removable (and/or non-removable) media implemented in any method or technology for storage of information such as computer-readable instructions, data structures, program modules or other data.

Computer storage media may include RAM, ROM, EEPROM, flash memory (or other memory technology), CD-ROM, digital versatile disks (DVD) (or other optical disk storage), magnetic cassettes, magnetic tape, magnetic disk storage (or other magnetic storage devices), etc. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" may mean a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1528 may include computer-storage media in the form of volatile and/or non-volatile memory. Memory 1528 may be removable, non-removable, or a combination thereof. Exemplary memory includes solid-state memory, hard drives, optical-disc drives, etc. As illustrated in FIG. 15, memory 1528 may store computer-readable, computer-executable instructions 1532 (e.g., software codes) that are configured to, when executed, cause processor 1526 to perform various functions described herein, for example, with reference to FIGS. 1A through 14. Alternatively, instructions 1532 may not be directly executable by processor 1526 but be configured to cause node 1500 (e.g., when compiled and executed) to perform various functions described herein.

Processor 1526 (e.g., having processing circuitry) may include an intelligent hardware device, e.g., a central processing unit (CPU), a microcontroller, an ASIC, etc. Processor 1526 may include memory. Processor 1526 may process data 1530 and instructions 1532 received from memory 1528, and information through transceiver 1520, the base band communications module, and/or the network communications module. Processor 1526 may also process information to be sent to transceiver 1520 for transmission through antenna 1536, to the network communications module for transmission to a core network.

One or more presentation components 1534 presents data indications to a person or other device. Exemplary one or more presentation components 1534 include a display device, speaker, printing component, vibrating component, etc.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a radio access network (RAN) based notification area (RNA) update for a radio resource control (RRC)_INACTIVE user equipment (UE) in an RRC_INACTIVE state, the method comprising:
receiving, by the RRC_INACTIVE UE in the RRC_INACTIVE state, a first list of RAN area identities (IDs) from a first cell;
receiving, by the RRC_INACTIVE UE in the RRC_INACTIVE state, first identification information broadcast by a second cell, the first identification information including a RAN area ID of the second cell and a cell ID of the second cell; and
performing, by the RRC_INACTIVE UE in the RRC_INACTIVE state, a 4-step random access procedure with the second cell to transmit second identification information to the second cell after determining that the RAN area ID of the second cell does not belong to the first list of RAN area IDs, wherein
a Message 3 (MSG3) of the 4-step random access procedure includes the second identification information.

2. The method of claim 1, further comprising:
determining, by the RRC_INACTIVE UE in the RRC_INACTIVE state, that the RRC_INACTIVE UE in the RRC_INACTIVE state is moving from a first RNA to a second RNA when the cell ID of the second cell or the RAN area ID of the second cell does not match any of a list of cell IDs or the first list of RAN area IDs.

3. The method of claim 1, further comprising:
initiating, by the RRC_INACTIVE UE in the RRC_INACTIVE state, an RNA update procedure after determining that the RAN area ID of the second cell does not belong to the first list of RAN area IDs; and
receiving, by the RRC_INACTIVE UE in the RRC_INACTIVE state, RNA information from the second cell during the RNA update procedure, the RNA information including at least one of the following:
a second list of RAN area IDs;
a list of cell IDs; and
a list of tracking area IDs.

4. The method of claim 1, wherein the second identification information comprises an inactive-radio network temporary identifier (I-RNTI).

5. A base station for a radio access network (RAN) based notification area (RNA) update, the base station comprising:
at least one memory storing a set of instructions; and
at least one processor coupled to the at least one memory, the at least one processor configured to execute the set of instructions to:
transmit first identification information of a second cell to a radio resource control (RRC)_INACTIVE user equipment (UE) in an RRC_INACTIVE state, the first identification information including a RAN area identity (ID) of the second cell and a cell ID of the second cell; and
receive, from the RRC_INACTIVE UE in the RRC_INACTIVE state, second identification information of a first cell during a 4-step random access procedure of an RNA update procedure with the RRC_INACTIVE UE in the RRC_INACTIVE state, wherein
a Message 3 (MSG3) of the 4-step random access procedure includes the second identification information.

6. The base station of claim 5, wherein the at least one processor is further configured to execute the set of instructions to:
transmit at least one of an inactive radio network temporary identifier (I-RNTI) and the cell ID of the second cell to the first cell.

7. The base station of claim 5, wherein the at least one processor is further configured to execute the set of instructions to:
receive, from a third cell, an RNA response;
receive, from a core network (CN), a UE-specific RNA response including a list of RAN area IDs; and
transmit the list of RAN area IDs to the RRC_INACTIVE UE in the RRC_INACTIVE state after determining that a first security key included in the RNA response from the third cell matches a second security key included in the UE-specific RNA response.

8. The base station of claim 5, wherein the at least one processor is further configured to execute the set of instructions to:
transmit RNA information to the RRC_INACTIVE UE in the RRC_INACTIVE state during the RNA update procedure, the RNA information including at least one of the following:
a list of RAN area IDs;
a list of cell IDs; and
a list of tracking area IDs.

9. The base station of claim 5, wherein the second identification information comprises an inactive radio network temporary identifier (I-RNTI).

10. The base station of claim 9, wherein the at least one processor is further configured to execute the set of instructions to:
transmit a second I-RNTI to the RRC_INACTIVE UE in the RRC_INACTIVE state during the RNA update procedure.

11. A user equipment (UE) in a radio resource control (RRC)_INACTIVE state for performing a radio access network (RAN) based notification area (RNA) update, the UE comprising:
at least one memory storing a set of instructions; and
at least one processor coupled to the at least one memory, the at least one processor configured to execute the set of instructions to:
receive a first list of RAN area identities (IDs) from a first cell;
receive first identification information broadcast by a second cell, the first identification information including a RAN area ID of the second cell and a cell ID of the second cell; and
perform a 4-step random access procedure with the second cell to transmit second identification information to the second cell after determining that the RAN area ID of the second cell does not belong to the first list of RAN area IDs, wherein
a Message 3 (MSG3) of the 4-step random access procedure includes the second identification information.

12. The UE of claim 11, wherein the at least one processor is further configured to execute the set of instructions to:
determine that the RRC_INACTIVE UE in the RRC_INACTIVE state is moving from a first RNA to a second RNA when the cell ID of the second cell or the RAN area ID of the second cell does not match any of a list of cell IDs or the first list of RAN area IDs.

13. The UE of claim 11, wherein the at least one processor is further configured to execute the set of instructions to:
initiate an RNA update procedure after determining that the RAN area ID of the second cell does not belong to the first list of RAN area IDs; and
receive RNA information from the second cell during the RNA update procedure, the RNA information including at least one of the following:
a second list of RAN area IDs;
a list of cell IDs; and
a list of tracking area IDs.

14. The UE of claim 11, wherein the second (I-identification information comprises an inactive radio network temporary identifier RNTI).

* * * * *